United States Patent
Keating et al.

(10) Patent No.: US 12,544,075 B2
(45) Date of Patent: Feb. 10, 2026

(54) FLOW RESTRICTING INTRAVASCULAR DEVICES FOR TREATING EDEMA

(71) Applicant: White Swell Medical Ltd, Kibbutz Shefayim (IL)

(72) Inventors: Ronan Keating, Galway (IE); Or Inbar, Tel-Aviv (IL); Ilan Grunberg, Kibbutz Shefayim (IL); Sagi Raz, Tel-Aviv (IL); Gerry Mccaffrey, Galway (IE); Eamon Brady, Galway (IE)

(73) Assignee: White Swell Medical Ltd, Kibbutz Shefayim (IL)

( * ) Notice: Subject to any disclaimer, the term of this patent is extended or adjusted under 35 U.S.C. 154(b) by 556 days.

(21) Appl. No.: 17/492,196

(22) Filed: Oct. 1, 2021

(65) Prior Publication Data

US 2022/0104827 A1  Apr. 7, 2022

Related U.S. Application Data

(60) Provisional application No. 63/086,217, filed on Oct. 1, 2020, provisional application No. 63/086,272, filed on Oct. 1, 2020.

(51) Int. Cl.
*A61B 17/12* (2006.01)
*A61M 60/216* (2021.01)
*A61B 17/00* (2006.01)

(52) U.S. Cl.
CPC .. *A61B 17/12109* (2013.01); *A61B 17/12036* (2013.01); *A61B 17/12136* (2013.01);
(Continued)

(58) Field of Classification Search
CPC ........ A61B 17/12109; A61B 17/12036; A61B 17/12136; A61B 2017/00022;
(Continued)

(56) References Cited

U.S. PATENT DOCUMENTS 3,211,150 A  10/1965  Foderick
3,884,240 A   5/1975  Gilman
(Continued)

FOREIGN PATENT DOCUMENTS

CA  2250993 A1  10/1997
EP  0526102 A1   2/1993
(Continued)

OTHER PUBLICATIONS

Blitz, 2014, Pump thrombosis—a riddle wrapped in a mystery inside an enigma, Ann Cardiothorac Surg, 3(5):450-471.
(Continued)

*Primary Examiner* — Jing Rui Ou
(74) *Attorney, Agent, or Firm* — Brown Rudnick LLP; Adam M. Schoen

(57) ABSTRACT

This disclosure relates to a catheter system that for precisely positioning fluid flow restrictors within a blood vessel. In particular, this disclosure provides a catheter system that includes a sheath with a first fluid flow restrictor mounted thereto, and a catheter that is slidably disposed within the sheath and has a second fluid flow restrictor mounted thereto. Inside a blood vessel, the sheath and the catheter are separately slidable, thereby allowing the first and second fluid flow restrictors to be positioned at precise locations within the blood vessel.

12 Claims, 15 Drawing Sheets

(52) U.S. Cl.
CPC . *A61M 60/216* (2021.01); *A61B 2017/00022* (2013.01); *A61B 2017/003* (2013.01); *A61B 2562/0247* (2013.01)

(58) Field of Classification Search
CPC ..... A61B 2017/003; A61B 2562/0247; A61M 60/216
See application file for complete search history.

(56) References Cited

U.S. PATENT DOCUMENTS

| | | | |
|---|---|---|---|
| 3,926,175 | A | 12/1975 | Allen et al. |
| 4,714,460 | A | 12/1987 | Calderon |
| 4,822,341 | A | 4/1989 | Colone |
| 4,838,864 | A | 6/1989 | Peterson |
| 4,957,484 | A | 9/1990 | Murtfeldt |
| 5,005,564 | A | 4/1991 | Grundei et al. |
| 5,019,040 | A | 5/1991 | Itaoka et al. |
| 5,069,662 | A | 12/1991 | Bodden |
| 5,108,370 | A * | 4/1992 | Walinsky ............ A61M 25/104 604/102.02 |
| 5,295,995 | A * | 3/1994 | Kleiman ............. A61M 25/104 604/103.07 |
| 5,397,307 | A * | 3/1995 | Goodin ................. A61M 25/10 604/103.08 |
| 5,702,364 | A | 12/1997 | Euteneuer |
| 5,792,300 | A | 8/1998 | Inderbitzen et al. |
| 5,836,912 | A | 11/1998 | Kusleika |
| 5,893,841 | A | 4/1999 | Glickman |
| 5,897,533 | A | 4/1999 | Glickman |
| 5,908,407 | A | 6/1999 | Frazee et al. |
| 5,911,685 | A | 6/1999 | Siess et al. |
| 5,919,163 | A | 7/1999 | Glickman |
| 5,921,913 | A | 7/1999 | Siess |
| 6,042,569 | A | 3/2000 | Finch, Jr. et al. |
| 6,139,517 | A | 10/2000 | Macoviak et al. |
| 6,152,945 | A | 11/2000 | Bachinski et al. |
| 6,165,196 | A | 12/2000 | Stack et al. |
| 6,179,796 | B1 | 1/2001 | Waldridge |
| 6,183,492 | B1 | 2/2001 | Hart et al. |
| 6,245,007 | B1 | 6/2001 | Bedingham et al. |
| 6,248,091 | B1 | 6/2001 | Voelker |
| 6,254,563 | B1 | 7/2001 | Macoviak et al. |
| 6,443,884 | B1 | 9/2002 | Miyawaki |
| 6,503,224 | B1 | 1/2003 | Forman et al. |
| 6,524,323 | B1 | 2/2003 | Nash et al. |
| 6,555,057 | B1 | 4/2003 | Bendera |
| 6,616,623 | B1 | 9/2003 | Kutushov |
| 6,635,068 | B1 | 10/2003 | Dubrul et al. |
| 6,699,231 | B1 | 3/2004 | Sterman et al. |
| 6,840,949 | B2 * | 1/2005 | Barbut ............... A61M 25/1011 604/96.01 |
| 6,878,140 | B2 | 4/2005 | Barbut |
| 6,936,057 | B1 | 8/2005 | Nobles |
| 7,022,097 | B2 | 4/2006 | Glickman |
| 7,195,608 | B2 | 3/2007 | Burnett |
| 7,645,259 | B2 | 1/2010 | Goldman |
| 7,766,892 | B2 | 8/2010 | Keren et al. |
| 7,780,628 | B1 | 8/2010 | Keren et al. |
| 8,109,880 | B1 | 2/2012 | Pranevicius et al. |
| 8,126,538 | B2 | 2/2012 | Shuros et al. |
| 8,216,122 | B2 | 7/2012 | Kung |
| 8,480,555 | B2 | 7/2013 | Kung |
| 8,679,057 | B2 | 3/2014 | Fulton, III et al. |
| 9,179,921 | B1 | 11/2015 | Morris |
| 9,358,329 | B2 | 6/2016 | Fitzgerald et al. |
| 9,405,942 | B2 | 8/2016 | Liao et al. |
| 9,421,316 | B2 | 8/2016 | Leeflang et al. |
| 9,433,713 | B2 | 9/2016 | Corbett et al. |
| 9,486,566 | B2 | 11/2016 | Siess |
| 9,533,054 | B2 | 1/2017 | Yan et al. |
| 9,533,084 | B2 | 1/2017 | Siess et al. |
| 9,642,991 | B2 | 5/2017 | Eversull et al. |
| 9,669,142 | B2 | 6/2017 | Spanier et al. |
| 9,669,144 | B2 | 6/2017 | Spanier et al. |
| 9,675,739 | B2 | 6/2017 | Tanner et al. |
| 9,682,223 | B2 | 6/2017 | Callaghan et al. |
| 9,750,861 | B2 | 9/2017 | Hastie et al. |
| 9,770,543 | B2 | 9/2017 | Tanner et al. |
| 9,878,080 | B2 | 1/2018 | Kaiser et al. |
| 9,901,722 | B2 | 2/2018 | Nitzan et al. |
| 9,962,170 | B2 | 5/2018 | Jansen et al. |
| 10,149,684 | B2 | 12/2018 | Nitzan et al. |
| 10,154,846 | B2 | 12/2018 | Nitzan et al. |
| 10,195,405 | B2 | 2/2019 | Nitzan et al. |
| 10,207,086 | B2 | 2/2019 | Nitzan et al. |
| 10,226,604 | B2 | 3/2019 | Nitzan et al. |
| 10,226,605 | B2 | 3/2019 | Nitzan et al. |
| 10,245,363 | B1 | 4/2019 | Rowe |
| 10,285,708 | B2 | 5/2019 | Nitzan et al. |
| 10,300,254 | B2 | 5/2019 | Nitzan et al. |
| 10,514,044 | B2 | 12/2019 | Schibli et al. |
| 10,639,460 | B2 | 5/2020 | Nitzan et al. |
| 10,653,871 | B2 | 5/2020 | Nitzan et al. |
| 10,709,878 | B2 | 7/2020 | Nitzan et al. |
| 10,912,873 | B2 | 2/2021 | Nitzan et al. |
| 10,926,069 | B2 | 2/2021 | Nitzan et al. |
| 10,960,189 | B2 | 3/2021 | Nitzan et al. |
| 11,007,353 | B2 | 5/2021 | Gerrans et al. |
| 11,166,730 | B2 | 11/2021 | Nitzan et al. |
| 11,179,550 | B2 | 11/2021 | Nitzan et al. |
| 11,179,551 | B2 | 11/2021 | Nitzan et al. |
| 11,179,552 | B2 | 11/2021 | Nitzan et al. |
| 11,357,959 | B2 | 6/2022 | Nitzan et al. |
| 11,406,393 | B2 | 8/2022 | Nitzan |
| 11,904,080 | B2 | 2/2024 | Nitzan et al. |
| 12,115,296 | B2 | 10/2024 | Nitzan et al. |
| 12,179,010 | B2 | 12/2024 | Nitzan et al. |
| 2001/0044598 | A1 * | 11/2001 | Parodi ................... A61B 17/22 604/104 |
| 2002/0010418 | A1 | 1/2002 | Lary et al. |
| 2003/0093109 | A1 | 5/2003 | Mauch |
| 2003/0134416 | A1 | 7/2003 | Yamanishi et al. |
| 2003/0208097 | A1 | 11/2003 | Aboul-Hosn et al. |
| 2004/0006306 | A1 | 1/2004 | Evans et al. |
| 2004/0039438 | A1 | 2/2004 | Alt |
| 2004/0064091 | A1 | 4/2004 | Keren et al. |
| 2004/0147871 | A1 | 7/2004 | Burnett |
| 2004/0210296 | A1 | 10/2004 | Schmitt et al. |
| 2004/0230181 | A1 | 11/2004 | Cawood |
| 2005/0085772 | A1 | 4/2005 | Zafirelis et al. |
| 2005/0228474 | A1 | 10/2005 | Laguna |
| 2005/0251180 | A1 | 11/2005 | Burton et al. |
| 2006/0030814 | A1 | 2/2006 | Valencia et al. |
| 2006/0064059 | A1 | 3/2006 | Gelfand et al. |
| 2006/0100658 | A1 | 5/2006 | Obana et al. |
| 2006/0161095 | A1 | 7/2006 | Aboul-Hosn et al. |
| 2006/0178604 | A1 | 8/2006 | Alderman |
| 2007/0055299 | A1 | 3/2007 | Ishimaru et al. |
| 2007/0282303 | A1 | 12/2007 | Nash et al. |
| 2007/0282382 | A1 | 12/2007 | Shuros et al. |
| 2008/0009719 | A1 | 1/2008 | Shuros et al. |
| 2008/0015628 | A1 | 1/2008 | Dubrul et al. |
| 2008/0071135 | A1 | 3/2008 | Shaknovich |
| 2008/0097412 | A1 | 4/2008 | Shuros et al. |
| 2008/0103573 | A1 | 5/2008 | Gerber |
| 2008/0103591 | A1 | 5/2008 | Siess |
| 2008/0140000 | A1 | 6/2008 | Shuros et al. |
| 2008/0294228 | A1 | 11/2008 | Brooke et al. |
| 2009/0018526 | A1 | 1/2009 | Power et al. |
| 2009/0112184 | A1 | 4/2009 | Fierens et al. |
| 2009/0131785 | A1 | 5/2009 | Lee et al. |
| 2010/0168649 | A1 | 7/2010 | Schwartz et al. |
| 2010/0179389 | A1 | 7/2010 | Moroney, III et al. |
| 2010/0280451 | A1 | 11/2010 | Teeslink et al. |
| 2010/0318114 | A1 | 12/2010 | Pranevicius et al. |
| 2011/0004046 | A1 | 1/2011 | Campbell et al. |
| 2011/0084019 | A1 | 4/2011 | Shiratori et al. |
| 2011/0092955 | A1 | 4/2011 | Purdy et al. |
| 2011/0257462 | A1 | 10/2011 | Rodefeld et al. |
| 2011/0276023 | A1 | 11/2011 | Leeflang et al. |
| 2011/0282274 | A1 | 11/2011 | Fulton, III |
| 2011/0295302 | A1 | 12/2011 | Mohl |
| 2012/0029466 | A1 | 2/2012 | Callaghan et al. |

(56) References Cited

U.S. PATENT DOCUMENTS

| | | |
|---|---|---|
| 2012/0157913 A1 | 6/2012 | Aziz et al. |
| 2012/0178986 A1 | 7/2012 | Campbell et al. |
| 2012/0259215 A1 | 10/2012 | Gerrans et al. |
| 2013/0096476 A1 | 4/2013 | Rogachevsky |
| 2013/0096494 A1 | 4/2013 | Kassab |
| 2013/0138041 A1 | 5/2013 | Smisson, III et al. |
| 2013/0177432 A1 | 7/2013 | Toellner et al. |
| 2013/0237954 A1 | 9/2013 | Shuros et al. |
| 2013/0245607 A1 | 9/2013 | Eversull et al. |
| 2013/0303969 A1 | 11/2013 | Keenan et al. |
| 2013/0317535 A1 | 11/2013 | Demmy |
| 2013/0331814 A1 | 12/2013 | Fulton, III et al. |
| 2013/0338559 A1 | 12/2013 | Franano et al. |
| 2014/0010686 A1 | 1/2014 | Tanner et al. |
| 2014/0128659 A1 | 5/2014 | Heuring et al. |
| 2014/0142616 A1 | 5/2014 | Smith |
| 2014/0155815 A1 | 6/2014 | Fulton, III et al. |
| 2014/0220617 A1 | 8/2014 | Yung et al. |
| 2014/0243790 A1 | 8/2014 | Callaghan et al. |
| 2014/0249386 A1 | 9/2014 | Caron et al. |
| 2014/0249614 A1 | 9/2014 | Levi et al. |
| 2014/0296615 A1 | 10/2014 | Franano |
| 2014/0303461 A1 | 10/2014 | Callaghan et al. |
| 2014/0336551 A1 | 11/2014 | Mantese et al. |
| 2014/0358036 A1 | 12/2014 | Holmes |
| 2015/0051634 A1 | 2/2015 | Kravik et al. |
| 2015/0157777 A1 | 6/2015 | Tuval et al. |
| 2015/0164662 A1 | 6/2015 | Tuval |
| 2015/0238671 A1 | 8/2015 | Mesallum |
| 2015/0283360 A1 | 10/2015 | Kelly |
| 2015/0343136 A1 | 12/2015 | Nitzan et al. |
| 2015/0343186 A1 | 12/2015 | Nitzan et al. |
| 2016/0022890 A1 | 1/2016 | Schwammenthal et al. |
| 2016/0045203 A1 | 2/2016 | Pollock |
| 2016/0051741 A1 | 2/2016 | Schwammenthal et al. |
| 2016/0082178 A1* | 3/2016 | Agah .......... A61B 6/504 600/435 |
| 2016/0129266 A1 | 5/2016 | Schmidt |
| 2016/0166463 A1 | 6/2016 | Douglas et al. |
| 2016/0169630 A1 | 6/2016 | Augustine et al. |
| 2016/0213826 A1 | 7/2016 | Tanner et al. |
| 2016/0331378 A1 | 11/2016 | Nitzan et al. |
| 2017/0014563 A1 | 1/2017 | Khir |
| 2017/0049944 A1 | 2/2017 | Kinoshita et al. |
| 2017/0095395 A1 | 4/2017 | Wennen et al. |
| 2017/0197021 A1 | 7/2017 | Nitzan et al. |
| 2017/0224512 A1 | 8/2017 | Hingston |
| 2017/0319764 A1 | 11/2017 | Tanner et al. |
| 2018/0012630 A1 | 1/2018 | Thomee et al. |
| 2018/0020456 A1 | 1/2018 | Wan et al. |
| 2018/0125499 A1 | 5/2018 | Nitzan et al. |
| 2018/0126130 A1 | 5/2018 | Nitzan et al. |
| 2018/0146968 A1 | 5/2018 | Nitzan et al. |
| 2018/0185622 A1 | 7/2018 | Nitzan et al. |
| 2018/0193614 A1 | 7/2018 | Nitzan et al. |
| 2018/0193615 A1 | 7/2018 | Nitzan et al. |
| 2018/0193616 A1 | 7/2018 | Nitzan et al. |
| 2018/0250456 A1 | 9/2018 | Nitzan et al. |
| 2018/0303986 A1 | 10/2018 | Meacham |
| 2019/0014991 A1 | 1/2019 | Maki et al. |
| 2019/0046706 A1 | 2/2019 | Aboul-Hosn et al. |
| 2019/0046707 A1 | 2/2019 | Aboul-Hosn et al. |
| 2019/0083761 A1 | 3/2019 | Nitzan et al. |
| 2019/0105436 A1 | 4/2019 | Uchida |
| 2019/0117943 A1 | 4/2019 | Nitzan et al. |
| 2019/0117944 A1 | 4/2019 | Nitzan et al. |
| 2019/0126014 A1 | 5/2019 | Kapur et al. |
| 2019/0167878 A1 | 6/2019 | Rowe |
| 2019/0223877 A1 | 7/2019 | Nitzan et al. |
| 2019/0366063 A1 | 12/2019 | Nitzan et al. |
| 2020/0016383 A1 | 1/2020 | Nitzan et al. |
| 2020/0030586 A1 | 1/2020 | Nitzan et al. |
| 2020/0030587 A1 | 1/2020 | Nitzan et al. |
| 2020/0046372 A1 | 2/2020 | Nitzan |
| 2020/0206485 A1 | 7/2020 | Nitzan et al. |
| 2020/0230380 A1 | 7/2020 | Nitzan et al. |
| 2020/0230381 A1 | 7/2020 | Nitzan et al. |
| 2020/0261706 A1 | 8/2020 | Nitzan et al. |
| 2020/0268951 A1 | 8/2020 | Nitzan et al. |
| 2020/0268952 A1 | 8/2020 | Nitzan et al. |
| 2020/0268954 A1 | 8/2020 | Nitzan et al. |
| 2020/0269025 A1 | 8/2020 | Nitzan et al. |
| 2020/0276369 A1 | 9/2020 | Nitzan et al. |
| 2020/0306436 A1 | 10/2020 | Tanner et al. |
| 2020/0397963 A1 | 12/2020 | Nitzan et al. |
| 2021/0121678 A1 | 4/2021 | Nitzan et al. |
| 2021/0378676 A1 | 12/2021 | Keating et al. |
| 2021/0378677 A1 | 12/2021 | Keating et al. |
| 2021/0378678 A1 | 12/2021 | Keating et al. |
| 2021/0379329 A1 | 12/2021 | Keating et al. |
| 2022/0039803 A1 | 2/2022 | Nitzan et al. |
| 2022/0104827 A1 | 4/2022 | Keating et al. |
| 2022/0104828 A1 | 4/2022 | Keating et al. |
| 2022/0218360 A1 | 7/2022 | Nitzan et al. |
| 2022/0218961 A1 | 7/2022 | Nitzan et al. |
| 2022/0280761 A1 | 9/2022 | Nitzan et al. |
| 2022/0280762 A1 | 9/2022 | Nitzan et al. |
| 2022/0331510 A1 | 10/2022 | Amstutz et al. |
| 2023/0007905 A1 | 1/2023 | Tschopp et al. |

FOREIGN PATENT DOCUMENTS

| | | |
|---|---|---|
| EP | 0629412 A2 | 12/1994 |
| EP | 2353501 A1 | 8/2011 |
| EP | 2353503 A1 | 8/2011 |
| EP | 2353632 A1 | 8/2011 |
| EP | 2497524 A1 | 9/2012 |
| EP | 2637927 A1 | 9/2013 |
| EP | 2662099 A1 | 11/2013 |
| JP | 2000-511442 A | 9/2000 |
| JP | 2001-515375 A | 9/2001 |
| JP | 2002-536079 A | 10/2002 |
| WO | 89/04193 A1 | 5/1989 |
| WO | 2000/024337 A2 | 5/2000 |
| WO | 01/013983 A2 | 3/2001 |
| WO | 2008/106103 A2 | 9/2008 |
| WO | 2010/078603 A2 | 7/2010 |
| WO | 2012/036238 A1 | 3/2012 |
| WO | 2012/135834 A2 | 10/2012 |
| WO | 2013/025826 A1 | 2/2013 |
| WO | 2013/061281 A1 | 5/2013 |
| WO | 2014/141284 A2 | 9/2014 |
| WO | 2014/141287 A1 | 9/2014 |
| WO | 2015/186003 A2 | 12/2015 |
| WO | 2017/087556 A1 | 5/2017 |
| WO | 2018/158636 A1 | 9/2018 |
| WO | 2018172848 A2 | 9/2018 |
| WO | 2018/202776 A1 | 11/2018 |
| WO | 2019/027380 A1 | 2/2019 |
| WO | 2019/113541 A1 | 6/2019 |
| WO | 2019/180179 A1 | 9/2019 |
| WO | 2020/174285 A2 | 9/2020 |
| WO | 2021/115562 A1 | 6/2021 |

OTHER PUBLICATIONS

Chikly, 2005, Manual techniques addressing the lymphatic system: origins and development, JAOA 105(10):457-464.

Ratnayake, 2018, The Anatomy and physiology of the terminal thoracic duct and ostial valve in health and disease: potential implications for intervention, J Anat 233:1-14.

Tchantchaleishvili, 2014, Evaluation and treatment of pump thrombosis and hemolysis, Ann Cardiothorac Surg, 3(5):490-495.

Bannon, 2011, Anatomic considerations for central venous cannulation, Risk Manag Healthc Policy 4:27-39.

Biran, 2017, Heparin coatings for improving blood compatibility of medical devices, Adv Drug Delivery Rev, 112:12-23.

Moscucci, 2014, Section III Hemodynamic principles 10 Pressure measurement, 223-244 in Grossman & Baim's Cardiac Catheterization, Angiography, and Intervention 8 Ed, 26 pages.

Shimizu, 2014, Embolization of a fractured central venous catheter placed using the internal jugular apporach, Int J 4 Surg Case Rep 5:219-221.

(56) References Cited

OTHER PUBLICATIONS

Stone, 2010, The effect of rigid cervical collars on internal jugular vein dimensions, Acad Emerg Med 17(1): 100-102.
Swan, 1970, Catheterization of the Heart in Man with Use of a Flow-directed Balloon-tipped Catheter, NEJM 283(9):447-451.
Webb, 2012, Roughness parameters for standard description of surface nanoarchitecture, Scanning 34:257-263.
Yancy, 2013, 2013 ACCF/AHA Guideline for the Management of Heart Failure, Circulation 128(16):e240-e327.
Canadian Exam Report issued in Canadian Application No. 3042153, date of mailing: Apr. 15, 2024, 6 pages.
European Exam Report issued in European Application No. 20763700.0, date of mailing: May 2, 2024, 7 pages.
Extended European Search Report issued in European Application No. 20184530.2, date of mailing: Apr. 19, 2024, 8 pages.
Extended European Search Report issued in European Application No. 21821380.9, date of mailing: Apr. 19, 2024, 12 pages.

* cited by examiner

Section A-A

FLOW RESTRICTING INTRAVASCULAR DEVICES FOR TREATING EDEMA

TECHNICAL FIELD

This disclosure relates generally to catheter systems for treating edema.

BACKGROUND

Heart failure occurs when the heart loses the ability to pump blood effectively. As a result, fluid backs up in the legs, ankles and feet, causing edema. Sometimes, fluid accumulates in the lungs (i.e., pulmonary edema), which can lead to difficulty breathing. If untreated, pulmonary edema can cause life-threatening injuries. Efficient and complete removal of excess fluid from the body's tissues is vital for positive patient outcomes.

One approach to removing excess fluid is to shift the fluid from the interstitial compartment (i.e., the fluid-filled spaces in connective tissue) and into the vascular compartment (i.e., blood vessels). From there, the excess fluid is removed by diuresis. Moving fluid from the interstitial compartment to the vasculature compartment can be accomplished by treatment with certain medical devices. The efficiency of such treatments can depend on the precise positioning of the device inside a patient's vasculature system. Unfortunately, positioning medical devices inside a patient's vasculature system is made challenging by the fact that dimensions of the vasculature system vary widely from patient to patient. Accordingly, most medical devices are not one-size fits all, and as such, for some patients, a fluid removal treatment may be effective whereas for other patients, the same treatment may be ineffective. Indeed, the diameter of a patient's blood vessel—especially veins—varies depending on the pressure within and outside that vessel. The pressure and thus the diameter of a given vessel depends on many factors including (i) whether it is an arterial vessel or a venous vessel, (ii) the position of the vessel relative to the heart, (iii) the postural orientation of the patient (supine, sitting, flat inclined, seated inclined etc., (iv) blood volume and (v) the use of inotropic agents during therapy.

The diameter of veins tends to vary more than arteries with pressure and as a result increases on blood volume tends to result in a greater increase in venous volume than arterial volume. Veins and arteries above the heart tend to have lower pressures than those below the heart when the patient is standing. Postural orientations (standing, sitting and lying) all impact the blood pressures in specific vessels. Even when a patient is still in a fixed position, the pressure will vary within a single cardiac cycle, with inspiration and expiration and also with blood volume. In patients suffering with edema vascular volume may be high (hypervolemic) and the veins may be enlarged. Over the course of therapy, the patient gradually become euvolemic and the pressure in the veins returns to normal and the vein diameters reduce. It will be appreciated that restricting blood flow with a conventional restrictor requires the treating physician to resize the restrictor many times during the procedure to ensure that the level of restriction is optimized for therapy.

A significant challenge with placing restrictors in the jugular circulation is the uncertainty of the collateral pathways for blood flow and in the absence of collateral pathways the potential for complications associated with excessively elevated intracranial pressure.

SUMMARY

This disclosure provides an adjustable catheter system to efficiently remove excess fluids from a patient's body. Specifically, the catheter system includes blood flow restrictors that are independently moveable to allow for precise positioning of the catheter inside the body. In some embodiments, the independent positioning of the blood flow restrictors allows a low-pressure zone to be exactly defined around a lymph duct to efficiently draw fluid from the interstitial compartment and into the circulatory system. The blood flow restrictors can be independently positioned on account of being mounted onto two independently moveable parts (i.e., a sheath and a catheter). During a treatment, the sheath, having a first blood flow restrictor, is inserted into a patient's blood vessel (e.g., a jugular vein). Subsequently, or simultaneously, the catheter with a second blood flow restrictor, is inserted into the sheath such that the catheter extends from a distal end of the sheath. The sheath and the catheter are independently slidable with respect to each other inside the blood vessel allowing for the exact positioning of the first and second fluid flow restrictors inside the patient's body. Accordingly, devices of the invention allow blood flow restrictors to be placed at optimal therapeutic locations inside the patient's body, despite variations of individual vasculature systems, by changing the relative positions of the sheath and the catheter inside the blood vessel. Once the fluid flow restrictors are optimally placed inside the blood vessel, the catheter system is used to effectively drain fluid from the lymphatic system and into the circulatory system, thereby removing excess fluid and alleviating symptoms associated with edema.

In one aspect, the invention provides an adjustable catheter system. The catheter system includes an indwelling, intravascular catheter with a sheath. The sheath preferably includes a distal end, with a first restrictor mounted thereto, that is dimensioned for insertion into a blood vessel, such as a jugular vein. The catheter includes a proximal portion and a distal portion with a second restrictor mounted to the distal portion. The catheter is dimensioned for insertion into the sheath such that the distal portion of the catheter extends from the distal tip of the sheath inside the blood vessel. When inside the blood vessel, the catheter and the sheath are independently movable relative to one another along a length of the blood vessel.

Advantageously, because the first restrictor and the second restrictor are mounted onto two separately moveable parts (i.e., sheath and catheter) the second restrictor and the first restrictor are separately movable along the length of the blood vessel by moving one of the catheter or the sheath, respectively. Accordingly, the first and second restrictors can be positioned at optimal locations within the blood vessel simply by moving the sheath or the catheter. For example, the first and second restrictors may be placed a first location and second location within the blood vessel, respectively, wherein the first location is upstream of a lymphatic duct and the second location is downstream of the lymphatic duct. Placement of the restrictors at these two positions defines an exact area of low pressure around an outlet of the lymphatic duct for withdrawing lymph from the lymph duct and into circulation.

In preferred embodiments, the first restrictor and the second restrictor are each selectively deployable comprising an inflated state and a collapsed state. The restrictors may be designed such that, upon inflation, the first and second restrictors expand radially outward to at least partially occlude the blood vessel and also anchor the sheath and/or the catheter, respectively, in place. When the second restrictor is collapsed, the distal portion of the catheter can be passed through the sheath, which may have a diameter of about 8-14 Fr. In some embodiments, the restrictors comprise inflatable balloons. The balloons may comprise a torpid shape. In one embodiment both restrictors comprise substantially similar shapes. In some embodiments, the proximal restrictor may be deployed to oppose the vessel wall and because of its shape, it may provide a local flow channels for blood flow between parts of the vessel wall and parts of the balloon outer surface. The distal balloon may be shaped so as to seal against the vessel wall around its entire circumference. When the distal balloon is inflated, flow across the distal balloon is preferably directed through a distal portion of the catheter, i.e., a cage/impeller assembly, because the distal balloon sealing opposes the wall of the vessel.

In one embodiment the first blood flow restrictor (of the sheath) comprises at least one flow channel configured to facilitate some fluid flow across the first blood flow restrictor. The at least one flow channel is preferably configured to allow a controlled blood flow across the restrictor so that circulation is maintained and the volume of blood flow across the restrictor is controlled. The at least one flow channel may comprise the outer surface of the restrictor or it may comprise a flow pathway through the restrictor. The at least one flow channel on the outer surface comprises at least one groove on the outer surface of the restrictor in its expanded state said at least one grove extending longitudinally and configured to reduce blood flow to downstream vessels and prevent hydrostatic pressure increases upstream. Where the at least one blood flow channel comprises a flow pathway through the restrictor said flow pathway may be partially coaxial with the sheath shaft. In one variation of this embodiment the sheath comprises an inlet port proximal of the restrictor, said inlet port configured to allow blood to flow into the lumen of the sheath and the inlet port and lumen configured to traverse blood flow across the restrictor in a controlled manner. In one embodiment the at least one flow channel comprises a groove in an otherwise torpid shaped restrictor.

In one embodiment the first blood flow restrictor (of the sheath) comprises a precision restrictor as defined in this patent. A precision restrictor is a restrictor that even when fully inflated and apposing the vein it facilitates a controlled level of blood flow across the restriction.

A precision restrictor may include any features disclosed in U.S. Provisional Patent App. No. 63/086,272, filed Oct. 1, 2020 and/or U.S. Provisional Patent App. No. 63/086,217, filed Oct. 1, 2020, both incorporated by reference. Precision restrictors preferably allow blood to flow only between the vein wall and the outer surface of the restrictor. Preferably the precision restrictor is configured to be indwelling for a period of time that is greater than 24 hours. With this embodiment the precision restrictor comprises an outer geometry that is non-thrombogenic. Preferably the outer geometry is configured such that flow passing across the restrictor does so without recirculation or boundary layer separation. In one embodiment the precision restrictor comprises an undulating surface.

Boundary layer separation or flow separation happens when the fluid momentum causes the fluid to flow against the local pressure gradient. With boundary layer separation the fluid is unable to continue to follow the profile of the restrictor as it flows around the restrictor and it separates from it. The disconnected fluid often comprises a region of turbulent flow. Boundary layer separation leads to the disconnected body of fluid adhering to the surface, a condition that is very pro-thrombotic. Boundary layer separation happen when the upstream or downstream geometry creates a region of surface that is protected from the higher shear forces that occur in the main body of flowing fluid.

In one embodiment the precision restrictor is expanded to exert a circumferential tension on a segment of the vessel at the site of placement of the precision restrictor. The precision restrictor is configured to induce a shape change on vessel cross section in the region of placement. In one embodiment, wherein the restrictor induces a shape change on the vessel cross section, the orifice cross sectional area of the restrictor comprises the sum of the cross-sectional area of a plurality of orifices. In one embodiment the precision restrictors comprise a smooth undulating surface with no steps or discontinuities. In one embodiment the precision restrictor is configured to ensure that there is a gradual acceleration of fluid as it is funneled towards the restrictive section of the flow channel. In one embodiment the precision restrictor comprises a single piece stretch blow molded membrane. In one embodiment the precision restrictor comprises a polyurethane, a PEBAX, nylon or fluoropolymer or another biocompatible elastomeric polymer. In one embodiment the precision restrictor comprises a hydrophilic, hydrophobic, non-thrombogenic or biocompatible coating. The precision restrictor may make the vessel assume the shape similar to a rounded rectangle or a rounded triangle.

In another variation of the at least one flow channel through the restrictor, the flow pathway may be offset relative to the axis of the sheath. In one embodiment the offset flow pathway comprises a tubular member, said tubular member extending longitudinally across the restrictor. The tubular member may be mounted on the shaft of the sheath or it may be integral with the restrictor. The tubular member in the assembled configuration defines a lumen and the lumen at least partially defines the flow pathway. In one embodiment the lumen is substantially round, obround, elliptical, D shaped or crescent shaped in cross section. In one embodiment the at least one flow channel comprises a lumen extending longitudinally through an otherwise torpid shaped restrictor.

In one embodiment the first restrictor is configured, when expanded, to control positive flow in proximal vessels. The reduction in positive (forward) flow in proximal vessels reduces the volume of fluid entering distal vessels. When applied to the venous system this typically reduces the net volume of fluid returning to the heart and thus reduces cardiac preload. In patients with elevated central venous pressure (CVP) reducing cardiac preload may reduce the workload on cardiac muscles and may improve right heart function. In another embodiment, where the restrictor is placed in a blood vessel that forms part of a collateralized vascular bed then the restrictor allows a controlled flow through the vessel in which it is placed but it also diverts some of the flow from the collateralized vascular bed to other branches in the vascular bed.

In one embodiment the first restrictor is used with a second restrictor and a pump to create a region of reduced relative blood pressure—the target region. In this embodiment the target region has lower blood pressure than connected upstream vessels and connected downstream vessels. In another embodiment the target region is adjacent the thoracic duct or the right lymphatic duct and the pressure in the target region is intermittently or continuously lower than the pressure in the thoracic duct.

In one embodiment the system comprises an energized component that is controlled so as to move blood across the second restrictor and maintain a low pressure in the target region. In a variation of this embodiment the energized component comprises a blood pump.

In one embodiment the at least one flow channel of the first restrictor reduces the cross-sectional area available for blood flow in the vessel by 40%. In another embodiment the at least one flow channel of the first restrictor reduces the cross-sectional area available for blood flow in the vessel by 60%. In another embodiment the at least one flow channel of the first restrictor reduces the cross-sectional area available for blood flow in the vessel by 80%. In another embodiment the at least one flow channel of the first restrictor reduces the cross-sectional area available for blood flow in the vessel by 90%. In another embodiment the at least one flow channel of the first restrictor reduces the cross-sectional area available for blood flow in the vessel by 95%.

In one embodiment the first restrictor of the sheath comprises an expandable elastomeric body, the expandable elastomeric body comprising a collapsed insertion configuration, and a plurality of expanded shapes. In the collapsed configuration the expandable elastomeric body is collapsed onto the surface of the sheath shaft and provides a smooth outer surface for the insertion of the sheath across the skin and tissues and into the patient's vessel. The expandable elastomeric body comprises an expansion surface and the expansion surface may expand radially as inflation force is applied. The expansion surface further comprises a first surface region and a second surface region wherein said first surface region may expand at a greater radial rate than said second surface region in response to said expansion force. The difference in the rates of expansion of said first and second surface regions leads to the expandable body defining at least one flow channel on the outer surface of the expandable body. The surface of the expandable body comprises at least one convex surface region and at least one concave surface region in an expanded state. The concave surface region is configured to extend longitudinally and thereby defines a groove across the restrictor—even when the restrictor is expanded into apposition with the vessel.

In a variation of this embodiment the expandable elastomeric body is designed such that when it is expanded and opposing the vessel wall that adjustment of the expanding forces alters the cross-sectional area of the flow channel allowing the physician to control the volume of fluid traversing the first restrictor.

In one embodiment the expandable elastomeric body comprises a soft region and a relatively stiffer region wherein the soft region expands at low force and the stiffer region requires greater force to expand it. In one embodiment the stiffer region of the expandable elastomeric body comprises a thicker wall. In another embodiment the stiffer region of the expandable elastomeric body comprises a reinforcement. In another embodiment the stiffer region of the expandable elastomeric body comprises a stiffer material.

In some instances, fluid is removed from the lymph system by creating a region of low pressure around a lymph duct with blood flow restrictors and allowing lymph fluid to drain into naturally into the circulatory system. In one variation of this embodiment, the catheter system can include a pump for pumping fluid from the region where the lymph duct drains to the venous system. The pump may be positioned within a distal portion of the catheter, e.g., within an impeller assembly, or the pump may be external to the patient.

The catheter system may include an inlet and an outlet disposed on the distal portion of the catheter for moving fluid therethrough. Preferably, during operation, the inlet is positioned between the second restrictor mounted on the catheter and the first restrictor mounted to the sheath. The inlet and the outlet may include features to prevent or minimize fluid flow disruptions during use. For example, the inlet and outlet may include smooth rounded edges or tapered surfaces that gently directs fluid flow.

In some embodiments, the pump is external to the patient. For example, an inlet disposed at the distal portion of the catheter may be designed to function as a suction port to "suck" fluid from the region where the lymph duct drains into the venous system and into a suction lumen within the catheter upon activation of the pump. The suction lumen may extend the length of the catheter to a port external to the patient to withdraw fluid from the vein through the action of an external pump. The catheter system may further include a discharge lumen in communication with a discharge line of the pump to return a portion of the fluid to venous circulation through a discharge port in the catheter. The discharge lumen may be distal of or proximal to the low pressure region adjacent to the lymph duct.

In preferred embodiments, the pump mechanism is housed inside the distal portion of the catheter. For example, the pump mechanism may be housed inside the distal portion of the catheter in an assembly referred to as the impeller assembly. The pump may comprise an impeller rotatably disposed within the impeller assembly at the distal portion of the catheter and the second restrictor may include an inflatable balloon connected to an exterior surface of the impeller assembly. In certain embodiments, when the balloon is inflated, it defines a torus. In some of those embodiments, a shape of a balloon in a deployed state directs and facilitates blood flow into an inlet of the impeller assembly. The impeller may be connected to a motor via a drive cable that extends through the catheter. During operation, the motor may be activated causing the impeller to rotate within the assembly. Rotation of the impeller may facilitate the movement of fluid into the inlet, through the distal portion of the catheter (i.e., impeller assembly), and out of the outlet. Movement of fluid may create a region of low pressure between the first and second restrictors and adjacent to the lymph duct, thereby causing fluid to drain from the lymph duct and into circulation.

In some embodiments, the catheter system further includes a control module for controlling operation of the pump. For example, the catheter system can include a controller to actuate the pump. The controller may be designed to actuate the pump in response to user operation of a control external to the patient's body. Alternatively, or in addition to, the controller may be designed to actuate the pump in response to a signal received from one or more sensors. For example, the catheter system can include a sensor, such as a pressure sensor, designed to be implanted in the patient's body, and the controller can be configured to actuate the pump in response to a measured value by the sensor exceeding a predefined threshold and/or the controller can be configured to control a speed of operation of the pump depending on a measurement made by the sensor. For example, in some instances, the catheter systems includes a pressure sensor disposed on at least one of the catheter or the sheath and wherein the control module receives input from the pressure sensor and controls the pump based on said input.

Aspects of the disclosure provide a device and associated method that uses blood flow restrictors to define an area of low pressure around a lymph duct to facilitate the removal of fluid therefrom. In this regard, the invention provides a method for treating edema. The method includes inserting a sheath into a patient's vein or artery. The sheath includes a first restrictor attached to a distal end of the sheath. The first restrictor can be navigated to a precise location within the vein or artery using an imaging system, e.g., ultrasound. Preferably, the first restrictor is placed upstream of a lymph duct. A catheter with a second restrictor may be advanced through the sheath. The second restrictor may be placed downstream of the lymph duct. The restrictors can be deployed, i.e., inflated, thereby defining an area of reduced pressure around a lymph duct to cause fluid to drain from the lymph duct and into circulation.

The method may include moving the second restrictor relative to the first restrictor during the procedure. The method may include confirming that the first restrictor is apposed to the wall of the vessel. The method may include using ultrasound imaging or fluoroscopic imaging to verify that the first restrictor is apposed to the wall of the vessel. The method may include using pressure measurements proximal of the first restrictor and/or distal of the first restrictor to verify apposition to the vessel wall. The method may include using ultrasound imaging or fluoroscopic imaging to adjust the rate of blood flow across the first restrictor. The method may include using pressure measurements proximal of the first restrictor and/or distal of the first restrictor to adjust blood flow across the first restrictor. The method may further include operating a pump to increase flow through the vein or artery of a patient and, subsequent or before the operating step, the restrictors may be deployed upstream and downstream of the pump to thereby restrict flow from a jugular vein to the innominate vein in order to define an area of low pressure and balance pressure downstream of the pump. The method may include operating the pump and then restricting the flow once the increased flow through the vein or artery affects pressure in the jugular vein. The method may further include sensing, with a pressure sensor, an increase in pressure in the jugular vein that results from the increased flow and restricting the flow in response to sensing the increased pressure in the jugular vein. Restriction of the flow may be adjusted according to the sensed pressure. Preferably, the method includes placing a device comprising the pump within vasculature of a patient prior to the operating step. The device comprises a catheter dimensioned to be at least partially implanted within the vasculature and the pump comprises an impeller assembly disposed at a distal portion of the catheter. In some embodiments, a proximal portion of the catheter is connected to a motor housing and the device includes a pressure sensor and a deployable restrictor attached to the catheter proximal to the pump. Preferably, the restrictors include inflatable balloons and restricting the flow includes inflating the restrictor. The sensing may be performed using a computer system communicatively connected to the pressure sensor. The inflation of the restrictor may be periodically or continually adjusted according to the sensed pressure.

In other aspects, this disclosure provides a method for treating edema. The method includes first introducing a catheter system into a blood vessel (e.g., a jugular vein) of a patient. The catheter system includes a sheath having a first restrictor mounted thereto and a catheter, slidably disposed within the sheath, the catheter having a second restrictor mounted to a distal portion of the catheter. Importantly, the first restrictor and the second restrictor are independently moveable relative to each another inside the blood vessel. The method further includes placing the first restrictor at a first location inside the patient by positioning the sheath and placing the second restrictor at a second location inside the patient by sliding the catheter through the sheath until the second restrictor is in the desired location. For example, the first location may be upstream of a lymphatic duct and the second location may be downstream of a lymphatic duct. In some embodiments, the restrictor is located in one blood vessel and the second restrictor is located in a different blood vessel. For example, the first restrictor may be positioned within a jugular vein and the second restrictor may be positioned within an innominate vein. In some instances, it may be helpful to position the restrictors underneath an imaging device, such as, an ultrasound imaging device. In some instances, the first restrictor is positioned in the vessel using an ultrasound probe placed in a supraclavicular or suprasternal position. In some instances, the second restrictor is positioned in the vessel using an ultrasound probe placed in a supraclavicular, suprasternal or intercostal position.

In preferred embodiments, the restrictors are selectively deployable, comprising an inflated state and a relaxed state. Deploying the restrictors, for example, by filling the restrictors with a fluid, inside the blood vessel, alters the fluid dynamics within said blood vessel. The deployed restrictor reduces the volume flow rate down stream of the restrictor and may reduce pressure downstream or may reduce the pump speed required to affect a pressure reduction downstream.

The catheter system may further include a pressure sensor. The method may further include the step of measuring the drop in pressure inside the blood vessel with the pressure sensor.

In some embodiments, the catheter system further includes a pump operably connected to the distal end of the catheter. Methods include activating the pump to pump fluid through the blood vessel. The pump may be external to the catheter. Alternatively, the pump may be included inside the catheter. For example, the pump may comprise an impeller disposed with an impeller assembly connected to the distal end of the catheter. In one embodiment, activation of the pump accelerates a flow of blood in the pump and thus create a low-pressure region proximal of the pump. In certain embodiments, the catheter system further comprises one or more sensors disposed on the catheter and/or the sheath. The one or more sensors include may include pressure sensors.

DETAILED DESCRIPTION

Figure 1:
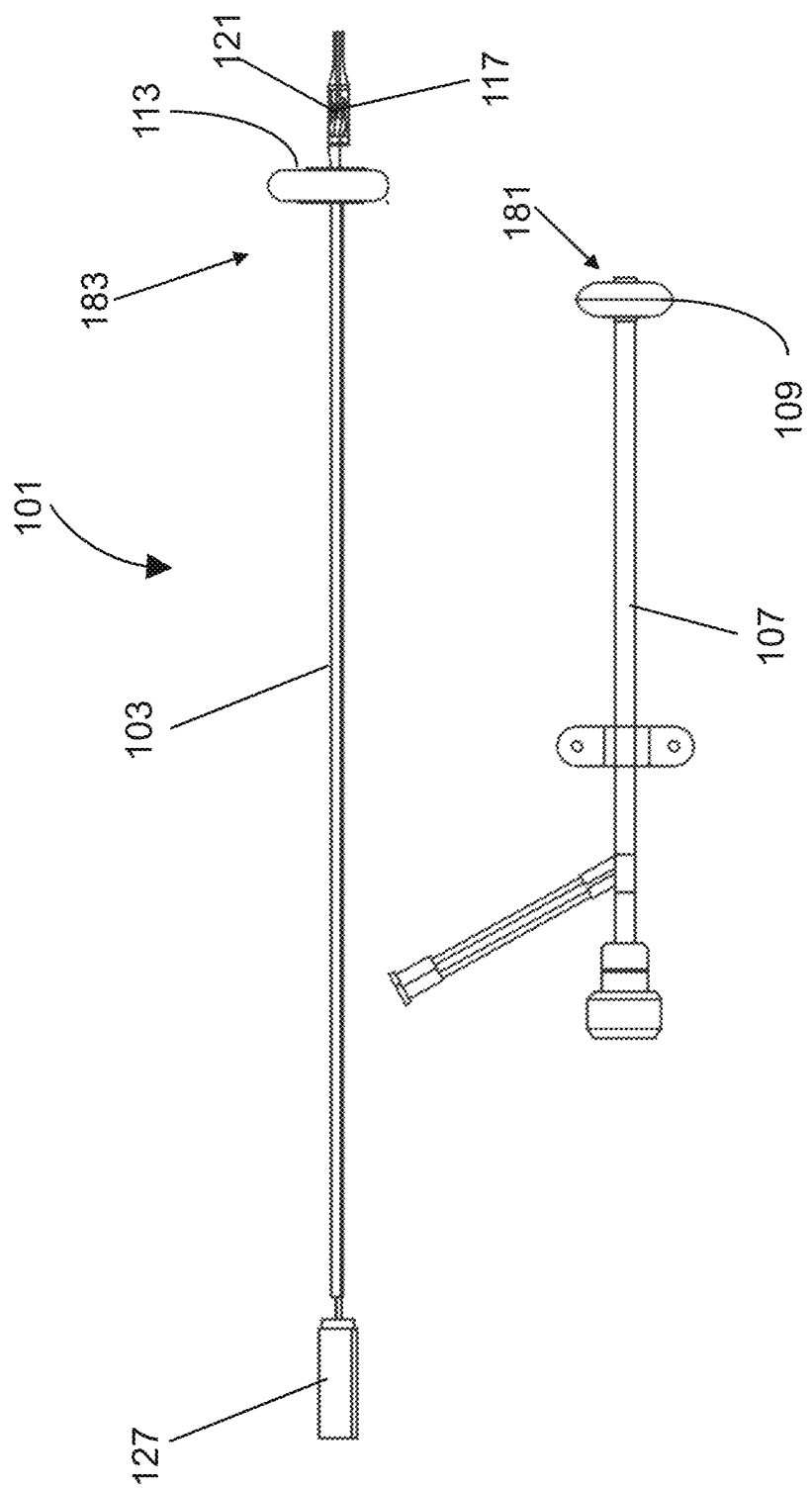
FIG. 1 shows an exemplary catheter system.

This disclosure provides intravascular devices with at least one deployable restrictor (e.g., a balloon) to regulate fluid flow in a patient's body. Preferably, the devices are used to remove excess fluid. In particular, this disclosure provides for the efficient removal of lymph fluid by offering devices and methods that allow a clinician or physician to precisely position one or more restrictors inside one or more vessels (e.g., blood vessels lymph ducts) and/or precisely modulate blood flow inside the blood vessel with the one or more blood flow restrictors. Fluids can be removed from the body using devices of the invention by, for example, establishing a region of low pressure near a lymph duct to cause lymph fluid to drain from the duct and into circulation where the fluid is removed by diuresis, for example, as described in co-owned U.S. application Ser. No. 16/801,994, incorporated by reference. Alternatively, fluids are removed using devices of the invention that directly remove fluid from the body by, for example, sucking the fluids into an apparatus that channels the fluids outside the body, for example as discussed in U.S. Pat. No. 9,901,722, incorporated by reference.

For example, devices of the invention include catheter systems with restrictors that are separately moveable within a blood vessel to allow for precise positioning of the restrictors during treatment. The blood flow restrictors are moveable within the blood vessel on account of being mounted onto two independently moveable parts (i.e., a sheath and a catheter). During treatment, a distal end of the sheath, having a first blood flow restrictor mounted thereto, is inserted into a blood vessel (e.g., a jugular vein). Subsequently, or simultaneously, a distal portion of the catheter with a second blood flow restrictor mounted thereto, is inserted into the sheath such that the distal portion of the catheter extends from the distal end of the sheath inside the blood vessel. The sheath and the catheter are made independently slidable with respect to each other, thereby allowing for the exact positioning of the first and second fluid flow restrictors inside the patient's circulatory system. Accordingly, devices of the invention allow blood flow restrictors to be placed at optimal therapeutic locations inside the vasculature system by sliding one of the sheath or the catheter inside the blood vessel. Once the fluid flow restrictors are placed inside a blood vessel, the catheter system is used to effectively drain fluid from the lymphatic system and into the circulatory system, thereby removing excess fluid and alleviating symptoms associated with edema.

In some embodiments, catheters of the invention can include one or more sensors. The one or more sensors are preferably pressures sensors, although, the invention is not limited to sensors for measuring pressure. Other examples of sensors that can be used to measure a parameter other than pressure include radio frequency transmitters and receivers, fluid sensors, bio impedance sensors, heart rate sensors, breathing sensors, activity sensors, etc. The sensors may be used to take measurements from the body and may be used to adjust a component of the catheter system. For example, the sensors may take measurements that are used to adjust a size of a restrictor by, for example, inflating or deflating the restrictor. Alternatively, or in addition to, the sensors may take measurements that are used to adjust a pump connected to the catheter for removing fluid. For example, input received from the one or more sensors can be used to adjust a speed of the pump, to turn the pump on, or turn the pump off. For further discussion of the types of sensors and how input from the sensors may be used, see, for example, U.S. Pat. No. 9,393,384; U.S. application Ser. No. 15/203,437; U.S. application Ser. No. 15/753,300; and U.S. application Ser. No. 16/168,357, each of which are incorporated by reference.

FIG. 1 shows an exemplary catheter system 101. The catheter system 101 includes two separate parts, a catheter 103 and a sheath 107. The sheath 107 includes a first restrictor 109 attached at a distal end 181 that is dimensioned for insertion into a blood vessel. In certain embodiments, the first restrictor 109 will include a fluid flow path (not shown). The catheter 103 includes a second restrictor 113 mounted to a distal portion 183 of the catheter 103, which is dimensioned for insertion into the sheath 107.

The restrictors 109, 113 preferably comprise balloons designed to be inflated (corresponding to an activated configuration) and deflated (corresponding to a relaxed configuration). In the inflated state, the restrictors at least partially occlude the blood vessel. Each of the first and second restrictors 109, 113 may comprise a balloon configured to be inflated, wherein in the relaxed configuration the balloon is not inflated and in the activated configuration the balloon is inflated. Preferably, the restrictors 109, 113 are inflated in response to delivery of a fluid. Accordingly, the first and second restrictors 109, 113 can be made from any one or more of a variety of materials configured to expand upon the delivery of a fluid thereto and to contract upon the withdrawal of the fluid. Exemplary materials from which the restrictors 109, 113 can be made include polymeric materials such as PEBAX, silicones, polyurethanes, PET's, and nylons or blends thereof.

Both the sheath 107 and the catheter 103 can include at least one inflation lumen through which an inflation fluid (e.g., air, liquid, etc.) can be introduced to inflate/deflate the restrictors. The at least one inflation lumen of the sheath 107 and the catheter 103 can be coupled with a computer system that inflates or deflates the restrictors in response to measured changes in blood pressure. Alternatively, the at least one inflation lumen of the sheath 107 and the catheter 103 can be coupled with a manual inflation device which is inflated by the treating physician.

During treatment, the sheath 107 can be inserted into a blood vessel, e.g., jugular vein, in the proximity of a lymph duct. The catheter 103 is dimensioned to be at least partially inserted into the sheath 107 with proximal portion of the catheter 103 extending exterior of the patient and the distal portion extending distal of the tip of the sheath 181. The distal end of the catheter 183 is configured to access veins that are deeper than those that can be accessed by the sheath 107. The first and second restrictors 109, 113 are moveable along a longitudinal length of the vein by sliding one of the catheter 103 or sheath 107 relative to each other. The distance between the first and second restrictors 109, 113 defines a target region of vasculature in which a low-pressure zone can be created when the catheter system 101 is implanted within the vein. For example, if the first restrictor is placed in the left internal jugular vein and the second restrictor is placed in the innominate vein then the target region includes the segment of vessel between the two restrictors as well as the territory of any branch vessels that merge with said segment of vessel. In our example the subclavian vein merges with the left internal jugular and the innominate vein at the venous angle and so it forms part of the target region. Once the first and second restrictors 109, 113 are positioned at desired locations, the catheter 103 may be fastened to the sheath via 107 via a fastening mechanism (not shown) to prevent further movement.

The catheter system may further include a pump 121, such as an axial motor pump, configured to pump fluid through the catheter. The catheter can be coupled to a motor 127 configured to drive the pump. The motor 127 can be included in the catheter (e.g., within a shaft of the catheter) and be configured to be implanted with the catheter 103, or the motor 127 can be located outside of the catheter 103 (e.g., outside of the catheter's shaft) and be configured to be located outside of the patient rather than be implanted therein. As discussed in more detail below, the pump 121 preferably comprises an impeller rotatably disposed within the distal portion 183 of the catheter 103 inside an impeller assembly 117. The impeller may be connected to a motor that is external to the patient, and when activated, the motor may cause the impeller to rotate thereby facilitating movement of fluid from the target region of vasculature. More particularly, the impeller assembly 117 may include one or more inlets and outlets disposed on the impeller assembly 117. Rotation of the impeller may create a force that pulls fluids from the target region of vasculature and through the impeller assembly 117 via the one or more inlets and outlets. The impeller action creates a reduced pressure at the inlet which draws fluid into the impeller assembly and this reduced pressure is transmitted to the target region of vasculature thus creating a low-pressure zone. In the example above the low-pressure zone includes the thoracic duct outlet and the pressure reduction at the thoracic duct outlet stimulates lymph flow into the low-pressure zone. The system when implanted is configured to maintain a low pressure in the target region of vasculature and this maintenance of low pressure at the thoracic duct facilitates drainage of excess interstitial fluid into the vascular compartment.

Exemplary materials from which the sheath 107 and the catheter 103 can be made include polyurethanes. The impeller assembly 117 is preferably made from a metal, such as, for example, a scandium, titanium, vanadium, chromium, manganese, iron, cobalt, nickel, copper, or zinc. The impeller assembly or elements of it may also be made from suitably specified engineering polymers such as Polyether ether ketones, Polysulfones, Nylons, or high durometer Polyurethanes such as Bionate 75D.

Figure 2:
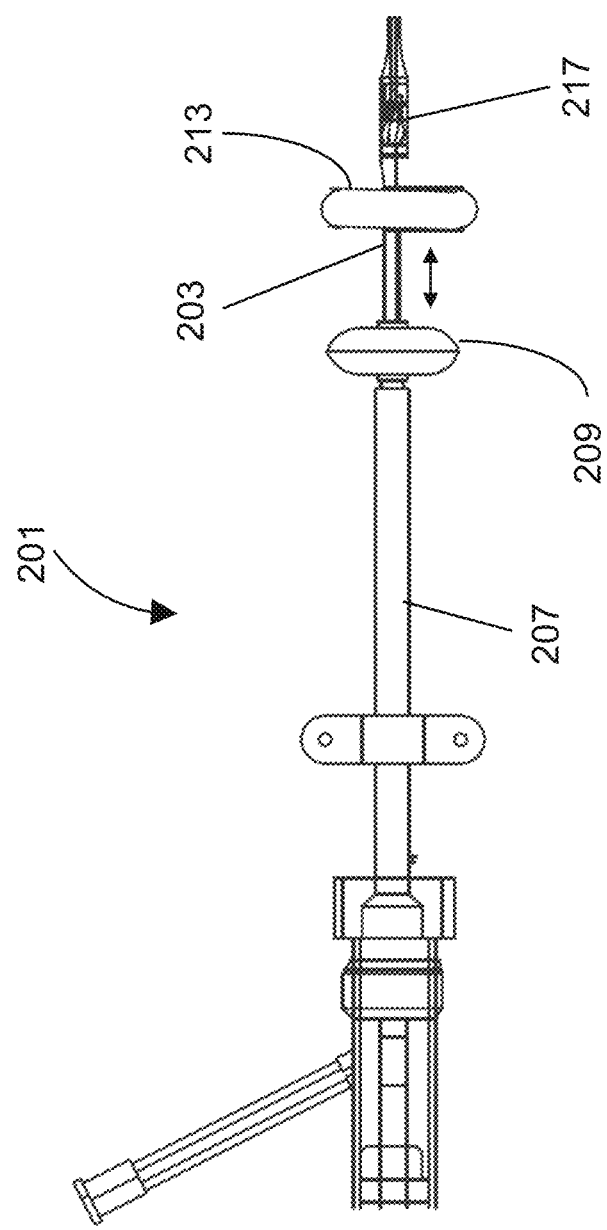
FIG. 2 shows a catheter system according to aspects of the disclosure.

FIG. 2 shows a catheter system 201 according to aspects of the disclosure. The catheter system 201 includes a catheter 203 that is partially encompassed within a sheath 207. The sheath 207 and the catheter 203 each include a restrictor, i.e., a first and second restrictor 209, 213, respectively. Either one of the first restrictor 209 or second restrictor 213 may include a fluid flow path, for example, as described in FIGS. 5 & 6.

The catheter 203 is dimensioned such that a distal portion of the catheter 203 is insertable into a proximal portion of the sheath 207. Upon insertion, the distal portion of the catheter 203 extends from the distal end of the sheath 207 such that the second restrictor 213, which is mounted to the catheter 203, is distal to the first restrictor 209 mounted on the sheath 207. Advantageously, because the first restrictor 209 is introduced into the body via the sheath 207, and does not need to pass through a component of the catheter system 201, e.g., a tube, the first restrictor 209 is less likely to tear or acquire abrasions caused by friction due to rubbing against a component of the catheter system 201. Accordingly, catheter systems of the present invention are less prone to breaking during treatment.

The catheter 203 is made to be slidable within the sheath 207. Because the catheter 203 is slidable within the sheath 207, a distance between the first restrictor 209 and the second restrictor 213 is adjustable by moving the catheter 203 longitudinally (indicated by the double arrows) relative to the sheath 207. Advantageously, this allows the restrictors to be placed at precise locations within the body. For example, the restrictors can be placed at precise locations on either side of a lymph duct to define an exact low-pressure zone for withdrawing lymph fluid. Because the low-pressure zone can be exactly defined, the low-pressure zone can be made small, thereby reducing the amount of work that a pump must do to further reduce pressure within the zone and withdraw fluid therefrom. Additionally, because the restrictors are separately movable, the restrictors can be placed at various locations within the body depending on the type of treatment to be performed. Accordingly, the utility of catheters of the invention are improved.

In one embodiment of using a catheter system 201 of the present invention, a first restrictor 209 and a second restrictor 213 can be positioned at desired locations within one or more blood vessels. The first and second restrictor 209, 213 can be positioned at desired locations by moving (e.g., sliding) the sheath 207 comprising the first restrictor 209 into the blood vessel and guiding the sheath 207 within the blood vessel until the first restrictor 209 is in the desired location, for example, immediately upstream of a lymph duct. The catheter comprising the second restrictor 213 may be advanced through the sheath by sliding the catheter 203 through a lumen of the sheath 207. The second restrictor 213 can be placed in a desired location by sliding the catheter 203 relative and through the sheath 207 inside the vein. The first and second restrictors 209, 213 can then each be activated (simultaneously or sequentially) to transition from the relaxed configuration to the activated configuration. The first and the second restrictors 209, 213, when activated provide two occlusions within the vein, defining a target zone there between within a portion of the vein in which the catheter is positioned. When activated the pump draws fluid from the target zone faster than is can replenish and effects a low-pressure zone. Higher pressure zones accordingly exist on the side of each restrictor opposite to the low-pressure zone.

Figure 3:
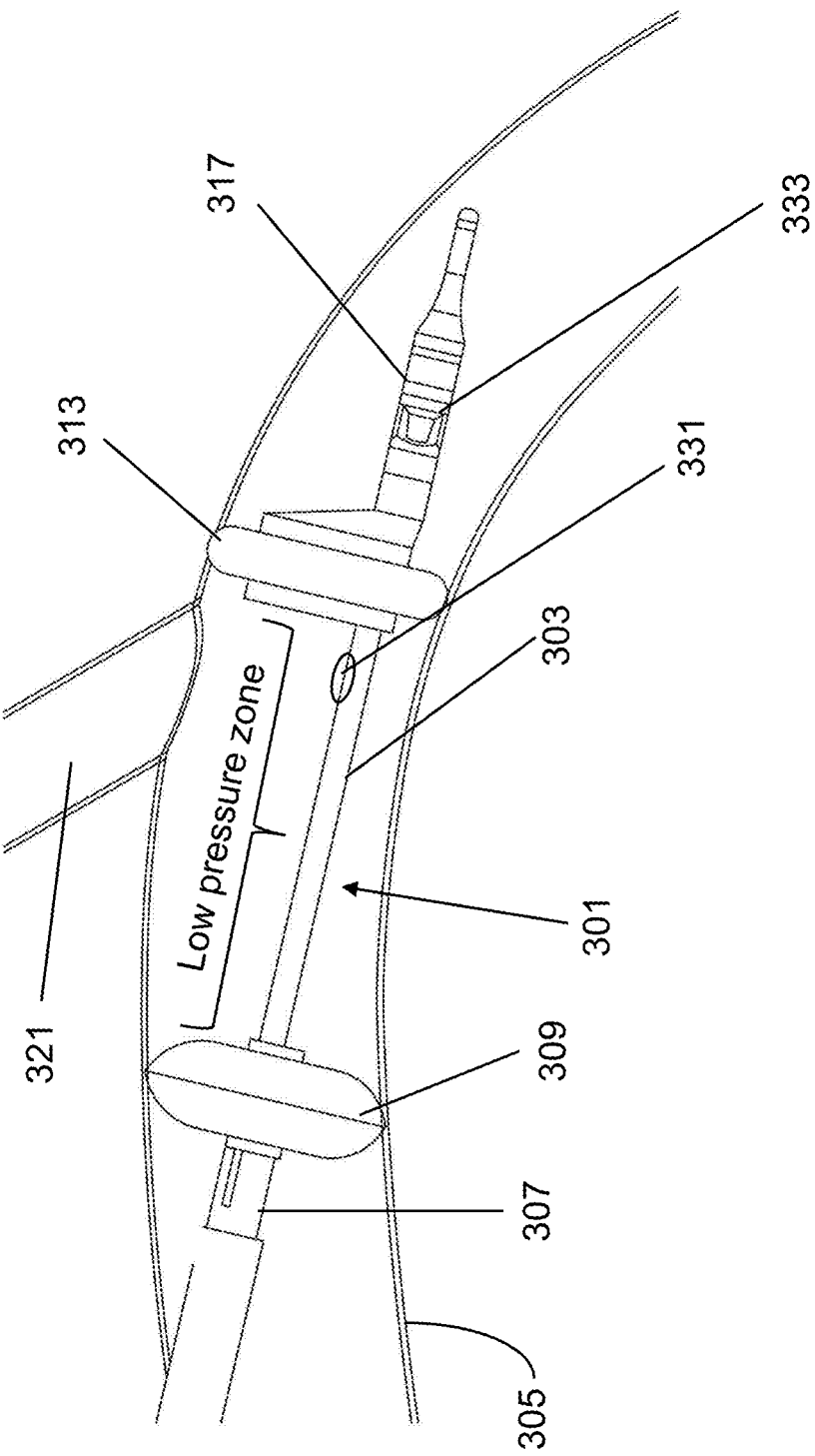
FIG. 3 shows a catheter system positioned within an internal jugular vein.

FIG. 3 shows a catheter system 301 positioned within an internal jugular vein 305. The catheter system 301 is positioned in preparation for a fluid removal treatment. The second restrictor 313 is positioned distal to an outflow port 321 of the patient's thoracic duct and the first restrictor 309 is positioned proximal to the outflow port 321 of the patient's thoracic duct. The low-pressure zone being defined between the first and second restrictors 309, 313 and located adjacent the outflow port 321 of the thoracic duct. The first restrictor 309 being positioned proximal to (e.g., upstream) of the outflow port 321 of the thoracic duct may help prevent back flow from the patient's subclavian vein 5 while providing the low-pressure zone and benefit(s) thereof.

The catheter 303 and sheath 307 may each include at least one inflation lumen (omitted from FIG. 3 for clarity of illustration) configured to facilitate inflation of the first and second restrictors 309, 313. The first and second restrictors 309, 313 are shown in the activated configuration in FIG. 3 with the first and second restrictors 309, 313 each abutting an internal surface of the jugular vein and the innominate vein respectively so as to provide two, spaced-apart occlusions therein. The first and second restrictors can each be formed in the shape of a torus, as in this illustrated embodiment, to facilitate the surrounding of the catheter system and/or to help prevent compression of the restrictors 309, 313 when they are moved radially outward during expansion thereof and thereby thus overcoming a possible tendency for the restrictors 309, 313 to collapse in response to an external pressure. The first and second restrictors 309, 313 can, however, have other shapes. In one embodiment the restrictors 309 and 313 are substantially similar in shape. In some embodiments, at least one of the restrictors, preferably the first restrictor, comprises a fluid flow path, as discussed in more detail below. The fluid flow path is designed to permit some fluid flow to bypass the restrictor so as to prevent excessive pressure buildup upstream of the restrictor and to maintain fluid flow in the upstream vessel segment.

The catheter 301 can include a shaft having a lumen, as shown in this illustrated embodiment, configured to communicate fluid therethrough so as to accommodate the flow of fluid in a vein in which the catheter 301 is implanted. The shaft can have a variety of sizes, such as having a diameter that is in the range of about 8 to 18 Fr (e.g., about 8 Fr, equal to or less than about 12 Fr, etc.) and having a length in the range of about 25 to 40 cm.

The catheter system 301 preferably includes an inlet 331 formed through a sidewall of the catheter 303. The inlet 331 can be in communication with the lumen so as to allow fluid to enter the lumen therethrough. The inlet 331 can include any number of openings formed through the catheter's 303 sidewall. Alternatively, as discussed further below, the inlet may comprise a funneled shape that facilitates a smooth movement of fluid flow into the system. For example, the inlet may comprise a cylindrical section located under the balloon. The inlet may further comprise a conical section distal thereof feeding into the impeller. For example, as discussed in U.S. application Ser. No. 16/801,994, incorporated by reference. Accordingly, the inlet may comprise a variety of different openings and can have any of a variety of configurations, e.g., slits, circular holes, ovular holes, rectangular slots, etc. The inlet 331 may comprise features that inhibit or reduce disruptions in fluid flow, thereby preventing thrombosis. For example, the inlet 331 may comprise smooth or tapered surfaces that gently direct fluid flow. During treatment, the inlet 331 may be located along the catheter's longitudinal length at a position between the first and second restrictors 309, 313 and within the target zone. In the exemplary embodiment depicted in FIG. 3, the inlet 331 is positioned adjacent the outflow port of a thoracic duct to allow fluid exiting the outflow ports to enter the catheter 301.

The catheter 303 includes a distal portion configured to be implanted within the patient's body (e.g., within the jugular vein, as shown in this illustrated embodiment) and a proximal end configured to not be implanted and instead be located outside the patient's body when the catheter's distal end is implanted. The distal end of the catheter 303 can be open so as to define a discharge opening or an outlet 333 of the catheter system 301 that allows fluid in the lumen to exit the catheter system 301 therethrough. The second restrictor 313 being positioned proximal to the discharge opening may help prevent back flow of fluid exiting the catheter system 301 through the discharge opening. The second restrictor 313 can thus be positioned just proximal to the discharge opening to help maximize backflow prevention.

The catheter system 301 may further include a controller and a motor (not shown) coupled to the catheter 303 and located outside of and proximal to the catheter's 303 proximal end so as to not be within the catheter's shaft and to be located outside of the patient's body. Alternatively, the catheter's proximal end can be configured to be implanted, such as when the controller or motor are included in the catheter's shaft.

The catheter system 301 can include a pump configured to drive fluid flow through the catheter 303, e.g., through the lumen thereof. The pump can have a variety of configurations. The pump may comprise an axial pump, a centrifugal pump or a mixed flow (with axial and centrifugal components) pump. Preferably the pump comprises a mixed flow impeller pump. The mixed flow pump can include an impeller and a drive shaft (e.g., a cable or a rod) each located in the catheter's shaft, e.g., in the lumen. Also as in this illustrated embodiment, the impeller can be located fully distal to the first restrictor 309 and can be located at least partially proximal to the second restrictor 313 so as to be at least partially located within the low pressure zone and hence near the distal inlet opening. The drive shaft can extend longitudinally through the catheter 303, e.g., through the lumen, to the controller or motor. The motor can be configured to drive the drive shaft, e.g., to rotate the drive shaft, and hence rotate the impeller. The drive shaft can be a solid member, which may provide structural stability to the drive shaft. Alternatively, the drive shaft can be hollow, e.g., be cannulated. The drive shaft being hollow can allow a guide wire to be advanced therethrough, which may facilitate delivery of the catheter system 301 into a vein.

The pump can be configured to pump fluid at a variety of rates. In an exemplary embodiment, the pump can be configured to pump fluid at a rate in a range of about 100 to 1000 ml/minute, which can provide a pressure reduction in the low pressure zone from a pressure in a range of about 10 to 20 mmHg (the pressure in the higher pressure zones) to a pressure in a range of about 0 to 6 mmHg (e.g., in a range of about 2 to 4 mmHg, which is a typical normal level, or in a range of about 2 to 5 mmHg, which is also a typical normal level). In at least some embodiments, the pump can have a static, e.g., unchangeable, flow rate. The flow rate can thus be predictable and/or chosen for a specific patient. In other embodiments, the pump can have an adjustable flow rate. The flow rate being adjustable can help the pump accommodate changes in the patient's condition over time and/or allow the pump to be driven at a selected rate for a particular patient. The flow rate can be adjustable in a variety of ways, as will be appreciated by a person skilled in the art, such as by being wirelessly adjusted using a user-operated control device located external to the patient and configured to wirelessly communicate with the pump (e.g., with the controller) to adjust the flow rate thereof.

In at least some embodiments, the controller can be configured to be in electronic communication with at least one pressure sensor (discussed in more detail below). A person skilled in the art will appreciate that a variety of suitable sensors can be used for monitoring pressure, such as central venous pressure (CVP) or other fluid pressure sensors, and blood pressure sensors. The at least one pressure sensor can be implanted in the patient as part of the catheter and/or the sheath. A further pressure sensor may be located exterior of the patient to measure atmospheric pressure and calibrate the intravascular sensor accordingly. If not already a part of the pump to be in electronic communication therewith, the at least one pressure sensor can be configured to be in electronic communication with the pump over a communication line such as a wired line or a wireless line. In an exemplary embodiment, two pressure sensors can be implanted in the patient. One of the pressure sensors can be implanted between the first and second restrictors 309, 313 so as to be in and monitor the low pressure zone, and the other the pressure sensors can be implanted in the vein either proximal to the first restrictor 309 or distal to the second restrictor 313 (e.g., distal to the discharge opening) so as to be in and monitor one of the higher pressure zones. The two sensors can thus allow a pressure differential to be determined between the low-pressure zone and the higher-pressure zone. In one embodiment the second pressure sensor is distal of the second restrictor and is designed to measure central venous pressure. In other embodiments, another number of pressure-sensors can be implanted in the patient (e.g., one, three, four etc.) and/or the pressure sensor(s) can be implanted at other locations.

The catheter 303 and/or the sheath 307 can include at least one lumen (not shown) configured to facilitate use of the pressure sensor(s), for example to facilitate placement of the pressure sensor(s) and/or to be filled with a fluid such as saline to allow for external pressure measurement.

In addition to or instead of the one or more pressure sensors, the controller can be configured to be in electronic communication with at least one other type of sensor (not shown) configured to sense a parameter other than pressure. Examples of sensors that can be used to measure a parameter other than pressure include radio frequency transmitters and receivers, fluid sensors, bio impedance sensors, heart rate sensors, breathing sensors, activity sensors, and optical sensors. Examples of the measured parameter include fluid amount (e.g., as measured by a fluid sensor, such as a fluid sensor placed in a lung to sense fluid amount in the lung), bio impedance (e.g., as measured by a bio impedance sensor), heart rate (e.g., as measured by a heart rate sensor), breathing rate (e.g., as measured by a breathing sensor), patient activity level (e.g., as measured by an activity sensor), and organ dimension (e.g., as measured by an optical sensor). The sensor can be implanted in the patient as part of the pump, implanted in the patient as a separate component from the pump (e.g., implanted in an interstitial space around a lung, implanted at a junction of a right subclavian vein of a patient and an internal jugular vein of the patient, implanted at a junction of a left subclavian vein of a patient and an internal jugular vein of the patient, etc.), or the sensor can be located external to the patient, such as by being on a skin surface thereof. If not already a part of the pump so as to be in electronic communication therewith, the non-pressure sensor(s) can be configured to be in electronic communication with the pump over a communication line such as a wired line or a wireless line. The non-pressure sensor(s) can include one or more sensors. In embodiments including a plurality of sensors, each of the sensors can be configured to measure the same parameter as or a different parameter than any one or more of the other sensors.

The motor can be included as part of the pump and can be configured to be implanted in the patient with the pump, or, as in this illustrated embodiment, the motor can be configured to be non-implantable. The motor being non-implantable can help the pump have a smaller size and/or can allow the pump to be driven by a more powerful motor since the motor can be larger than an implantable motor.

The controller can be included as part of the pump and can be configured to be implanted in the patient with the pump, or, the controller can be configured to be non-implantable. The controller being part of the pump can help allow the pump to be a self-contained system, although in such a controller requires space in the pump, which can increase a size of the pump. In this embodiment the controller may be located at a proximal end of the catheter and implanted extravascular. The controller and pump may be housed in a common housing for extravascular implantation, in a body of tissue for example. The controller being non-implantable can help the pump have a smaller size and/or can allow the pump to be controlled by a more powerful processor since the processor can be more easily upgraded than if implanted with the pump and/or since the processor's size can be less important when outside the pump as opposed to inside the pump.

The controller can include any type of microprocessor or central processing unit (CPU), including programmable general-purpose or special-purpose microprocessors and/or any one of a variety of proprietary or commercially available single or multi-processor systems. The controller can be a component of a control system that includes any number of additional components, such as a memory configured to can provide temporary storage and/or non-volatile storage; a bus system; a network interface configured to enable the control system to communicate with other devices, e.g., other control systems, over a network; and an input/output (I/O) interface configured to connect the control system with other electronic equipment such as I/O devices (e.g., a keyboard, a mouse, a touchscreen, a monitor, etc.) configured to receive an input from a user.

The controller can be configured to receive user input thereto to control any of a variety of aspects related to the catheter system 301, such as speed of the motor and ideal range of pressure for the low-pressure zone. In some embodiments, the controller assists with placing the first and second restrictors within the blood vessel so as to help a clinician establish an ideal low-pressure zone within the blood vessel for removing fluid. For example, the controller may receive inputs from one or more pressure sensors located between the first and second restrictor and may report those inputs to a clinician along with an ideal range of pressure for the low-pressure zone. The clinician can then adjust the first or second restrictor by sliding one of the sheath or catheter until the reported pressure falls within the ideal range.

In at least some embodiments, the pump can be configured to change its pumping rate (e.g., from zero to a non-zero value, from a non-zero value to zero, or from one non-zero value to another non-zero value) based on pressure measured by the at least one pressure sensor. The controller can be configured to effect such change in response to the sensed pressure. If the measured pressure exceeds a predetermined threshold maximum pressure value, the pump can be configured to increase its pump rate (e.g., increase from zero or increase from some non-zero value) in an effort to decrease the pressure. For example, if the measured pressure within the low-pressure zone is too high (e.g., is above a predetermined threshold), the pump can increase its pump rate to decrease the pressure within the low-pressure zone. For another example, if the measured pressure within the low-pressure zone is below a predetermined threshold, the pump can decrease its pump rate to maintain or increase the pressure within the low-pressure zone. For yet another example, if a measured pressure differential between the low-pressure zone and the higher-pressure zone is not sufficiently great (e.g., is below a predetermined threshold), the pump can increase its pump rate to increase the pressure differential. The drive shaft may be coupled to the pump and may be designed to rotate the pump at high speed. In one embodiment the drive shaft is designed to rotate the impeller at a speed of over 10,000 revolutions per minute (RPM). In another embodiment drive shaft is designed to rotate the impeller at a speed of over 15,000 RPM. In another embodiment drive shaft is designed to rotate the impeller at a speed of over 20,000 RPM. In yet another embodiment drive shaft is designed to rotate the impeller at a speed of over 25,000 RPM.

Figure 4:
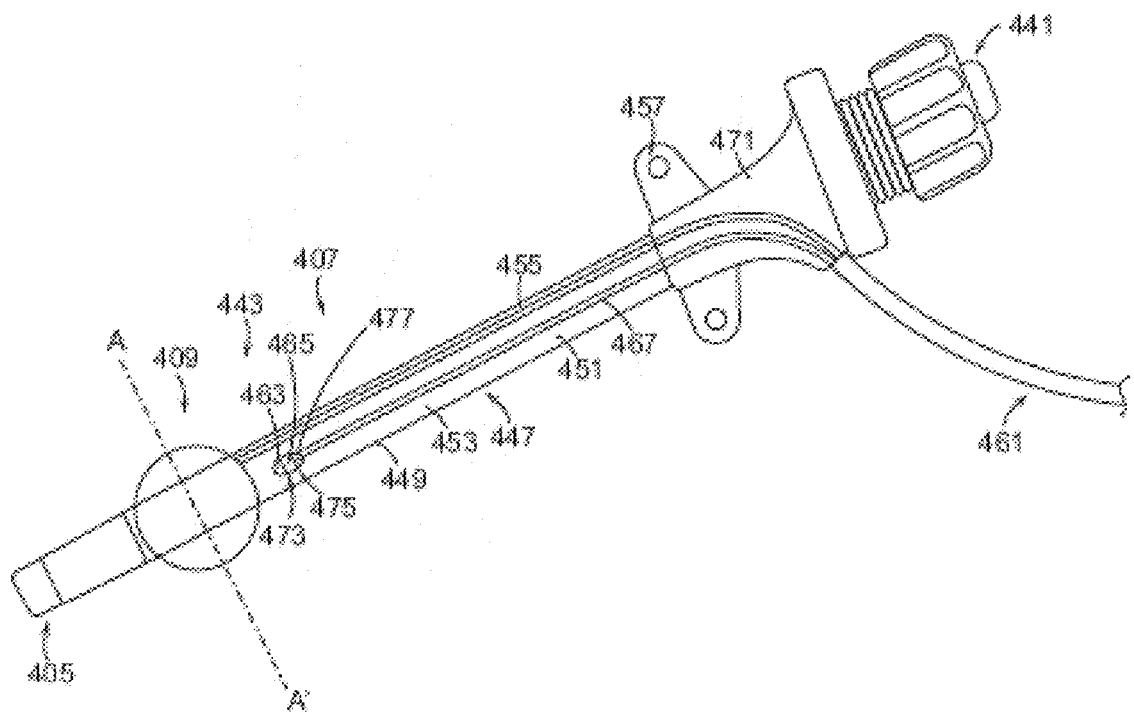
FIG. 4 shows a sheath according to aspects of the invention.

FIG. 4 shows a sheath 407 according to aspects of the invention. The sheath 407 includes a proximal portion 441 and a distal portion 443. The distal portion 443 is dimensioned for insertion into a vein or artery. The sheath 407 may comprise an elongated cylindrical body 447 that is substantially smooth across its surface with a first restrictor 409 that is mounted near a distal tip 405. The body 447 comprises an inner lumen configured for the advancement of a catheter therethrough. The body 447 is blood contacting on its outer surface and its inner surface and it is configured such that both of these surfaces are biocompatible and non-thrombogenic. The body 447 may comprise multiple parts that offer structural reinforcement. For example, the body 447 may comprise a jacket 449 disposed over a shaft 451 with a coil 453 disposed therein. The jacket 449 may comprise an over jacket and an under jacket with the over jacket on top of the coil and the under jacket beneath the coil. Preferably the jacket 449 comprises a soft conformable and biocompatible material. Exemplary materials include PEBAX, polyurethanes, such as Pellethane, Tecothane or Tecoflex preferably in the 70 to 90A durometer range, and fluoropolymers such as FEP and PTFE. The coil 453 can provide structural support around a circumference of the body 447 to prevent an interior lumen (e.g., a lumen for receiving a catheter) from collapsing after insertion into the blood vessel. The coil preferably has a low pitch with either minimal gaps or no gap between adjacent rings of the coil. The coil 453 is configured to allow the shaft to flex and conform to the body anatomy while maintaining a circular lumen (without kinking or deformation). The choice of a soft polymer jacket material and a low pitch coil 453 also allows the cylindrical body 447 to assume and hold a curved configuration with minimal bending forces. In one embodiment the cylindrical body is configured such that at least a portion of said cylindrical body conforms to a radius of less than 40 mm without ovality or kinking. In one embodiment the cylindrical body is configured such that at least a portion of said cylindrical body conforms to a radius of less than 30 mm without ovality or kinking. In one embodiment the cylindrical body is configured such that at least a portion of said cylindrical body conforms to a radius of less than 20 mm without ovality or kinking.

The sheath 407 includes an inflation lumen 455. The inflation lumen 455 is fluidically coupled with the first restrictor 409 to provide a mechanism for inflating the first restrictor 409 inside the blood vessel. The first restrictor 409 is inflatable via the inflation lumen 455 by delivering a fluid such as saline through the inflation lumen to the first restrictor 409. A pump may be used to facilitate the delivery of the fluid through the lumen 455 and into the first restrictor 409.

The sheath 407 includes a pressure sensor lumen 467 and a pressure sensing port 463. The pressure sensor lumen 467 provides an isolated lumen to facilitate blood pressure measurement at a distal region of the sheath 407. The pressure sensor 465 may be proximal of the restrictor 409 and/or distal of the restrictor 409. The pressure sensor lumen 467 extends proximally to the hub 471 and connects to a lumen of the multi-lumen tubing 461. The pressure sensing port 463 may comprise an opening in the wall of the cylindrical body 447 and may hydrostatically connect a distal portion of the pressure sensor lumen 467 to blood pressure in the vessel. The pressure sensor 465 may be positioned in the pressure sensor lumen 467 adjacent to the port 463 and may be designed to measure blood pressure in the vessel. The pressure sensor 465 may be connected to a console to translate the pressure signal into data or graphics for the user.

It is desirable that the body 409 of the sheath 407 be as small as possible for atraumatic insertion into the blood vessel. Therefore, the pressure sensor 465 of the invention may comprise a miniature pressure sensor. The pressure sensor 465 may be configured to fit inside the pressure sensing lumen 467 of the body 409. In one embodiment, the miniature pressure sensor is configured to fit inside a lumen with a maximum dimension of less than 350 micrometers. In one embodiment, the miniature pressure sensor is configured to fit inside a lumen with a maximum dimension of less than 300 micrometers. In one embodiment, the miniature pressure sensor is configured to fit inside a lumen with a maximum dimension of less than 250 micrometers.

In one embodiment, the pressure sensor 465 comprises a distal assembly 473 wherein the assembly comprises a sensing membrane 475 and a support structure 477. The sensing membrane 475 may sense pressure when exposed to a pressure. In one embodiment the sensing membrane 475 deflects under pressure and the deflection of the sensing membrane 475 is measured optically and said optical measurement is translated into a pressure measurement. In another embodiment the sensing membrane 475 comprises a piezoresistive membrane and changes in resistance are translated into a pressure measurement. The support structure may be provided to protect the sensing membrane 477 and to orient the membrane into hydrostatic communication with blood in the vessel. It is important that the pressure sensing membrane 475 is close to the pressure port and in hydrostatic communication with blood in the vessel and is protected from inadvertent damage during sheath manipulation, bending and use. In one embodiment the structure 477 comprises a rigid structure to protect said sensing membrane 475.

In at least some embodiments, the distal tip 405 is a soft atraumatic tip that facilitates smooth, safe introduction of the sheath 407 into the vein. Exemplary materials from which the atraumatic tip can be made include polyurethanes and PEBAX's.

The proximal portion 441 of the sheath 407 is external to a patient's body during a treatment. The proximal portion 441 can include a number of features for navigating and securing the catheter system in place during the treatment. For example, the proximal portion may include a suture ring 457 to secure sheath 407 during catheter manipulation or during prolonged vascular access. Additionally, the proximal portion 441 may include multi-lumen tubing 461. The multi-lumen tubing 461 may include the inflation lumen 455 and a lumen for flushing the central lumen of the cylindrical body 447. The multi-lumen tubing may also include a lumen for one or more pressure sensors disposed on the sheath 407.

Figure 5:
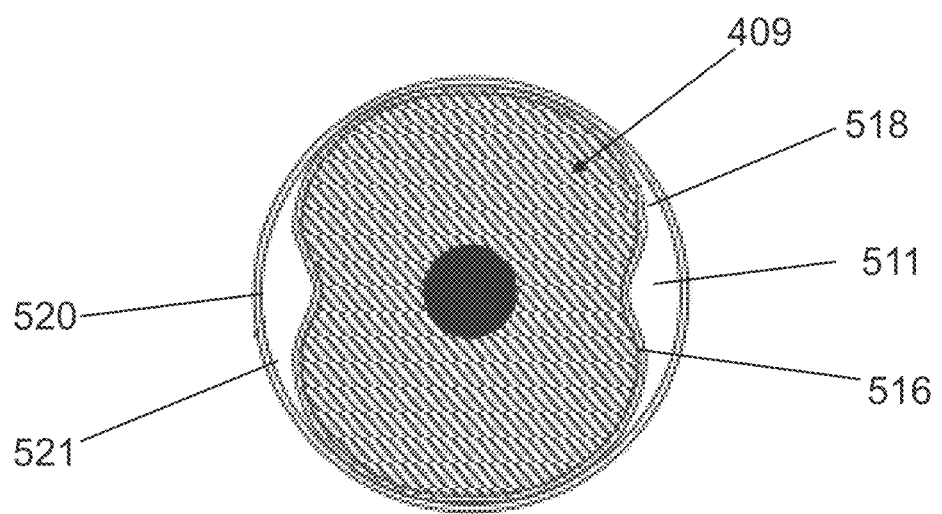
FIG. 5 is a cross-section along line A-A' when the sheath is in a vessel.

FIG. 5 is a cross-section taken along line A-A' when the sheath 407 is disposed inside a blood vessel 520. This view highlights a fluid flow path 511 defined between an outer surface 516 of the first restrictor 409 and a wall 521 of the blood vessel 520. The outer surface 516 of the first restrictor 409 includes an inflection point 518 defining a change in curvature around a circumference of the first restrictor 409.

The change in curvature defines an opening between the first restrictor 409 and the wall 521 of the blood vessel 520. In one embodiment the outer surface 516 comprises at least one region of convexity and at least one region of concavity. In this embodiment the region of concavity ensures that the flow path is stable even if the restrictor is over expanded or the vessel wall contracts during the procedure. It will be appreciated that this arrangement provides a flow channel that is relatively stable as the inflation pressure in the restrictor is varied and relatively stable even as the ID of the vessel changes (with changes in patient blood volume status).

Figure 6A:
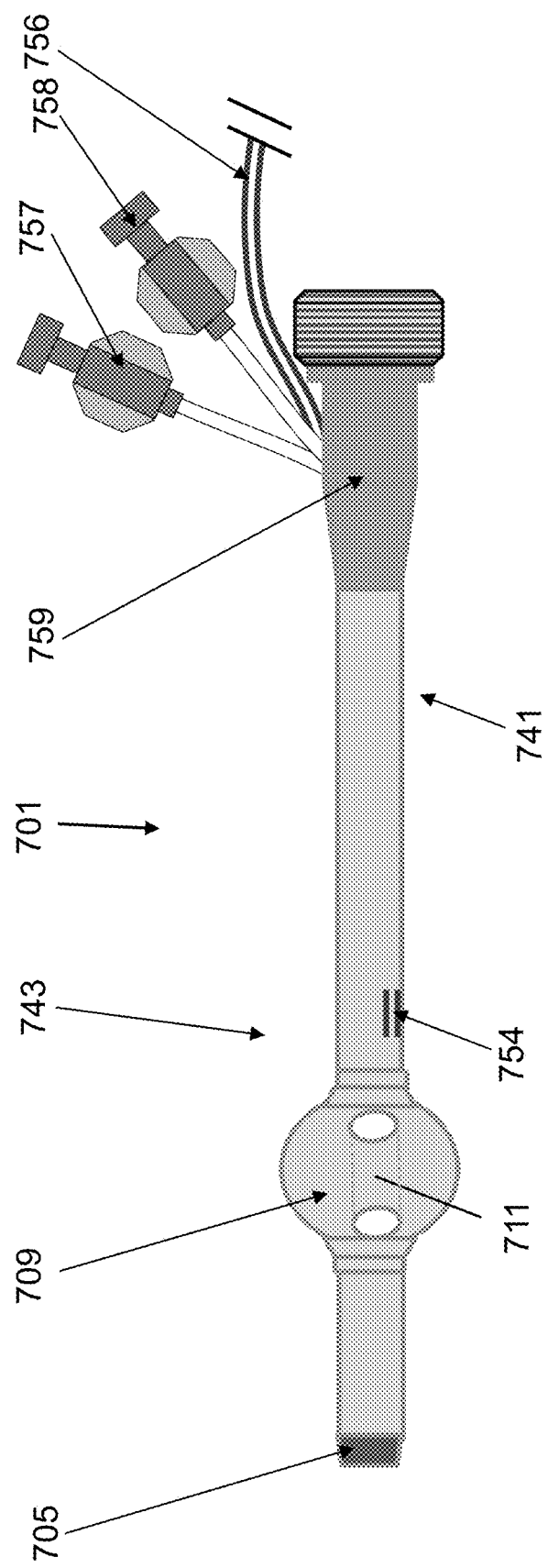
FIG. 6A shows a sheath with a restrictor.

FIG. 6A shows a sheath 701 with a restrictor 709. The restrictor 709 is illustrated in a deployed/inflated state and comprises a fluid flow path 711. The sheath 701 also includes a distal portion 743 that is dimensioned for insertion into a blood vessel. The distal portion 743 can include a distal atraumatic tip 705 that has a soft material (e.g., polyurethane, pebax) in order to prevent damage to the blood vessel during insertion of the sheath. Preferably the tip 705 comprises a smooth transition for a dilator (shown in FIG. 6C). In one embodiment the tip 705 comprises a slightly smaller ID than the shaft so as to gently contact the surface of the dilator for insertion through skin, tissue and into a blood vessel.

At a proximal portion 741 of the sheath 701, is a hub 759. The hub 759 may be designed to facilitate inflation of the restrictor 709. For example, the hub 759 may provide access to one or more inflation lumens that extend through the sheath 701 and connect to the restrictor 709. The restrictor 709 can be inflated by infusing a fluid into an inflation port 757 at the hub 759. The hub 759 may also provide access to a flush port 758 to flush the inner lumen of the shaft of the sheath 701. For example, a fluid, such as, a purge fluid may be delivered via the flush port which is external to the patient. The purge fluid can be used to purge or clear debris; for example, as described in co-owned U.S. Provision Application 62/629,914, which is incorporated by reference. The proximal portion 741 may also include a sensor lead 756, for receiving input from a sensor 754 disposed on the distal portion 743 of the sheath 701.

Figure 6B:
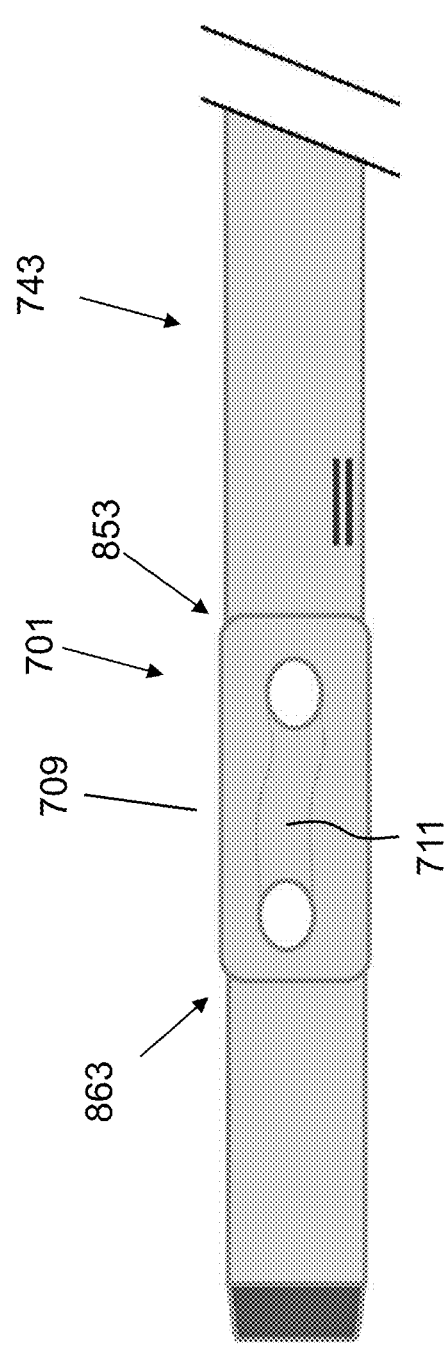
FIG. 6B shows a blown-up view of the distal portion of the sheath.

FIG. 6B shows a blown-up view of the distal portion 743 of the sheath 701. In this embodiment the restrictor 709 is shown in the collapsed state. In one embodiment the collapsed state of the restrictor comprises a tube. In this embodiment the collapsed restrictor 709 comprises a substantially cylindrical configuration. In one embodiment the substantially cylindrical configuration of the collapsed restrictor is similar in diameter to the outer surface of the shaft of the sheath 701. It will be appreciated that this is a very desirable attribute as it allows the collapsed restrictor 709 to be inserted into the patient without dilating the entry site additionally or causing any additional trauma. The restrictor of this embodiment comprises a highly resilient elastomer. Preferably the elastomer comprises a low hysteresis elastomer and can recover from elongations in excess of 250%. Preferably the elastomer comprises a low hysteresis elastomer and can recover from elongations in excess of 300%. Preferably the elastomer comprises a low hysteresis elastomer and can recover from elongations in excess of 400%.

When used in a venous application the flow channel 711 may comprise a fluid inlet port 853 on the proximal surface of the restrictor 709 and a fluid outlet port 863 on the distal surface of the restrictor 709. When used in an arterial application the flow channel 711 may comprise a fluid inlet port on the distal surface of the restrictor 709 and a fluid outlet port on the proximal surface of the restrictor 709.

In one embodiment the flow channel 711 comprises a tubular member extending across the restrictor. In one embodiment the flow channel tubular member is collapsible. In one embodiment the flow channel comprises a reinforcement. In one embodiment the flow channel 711 is self-expanding. In one embodiment the flow channel 711 is a non-linear flow channel. In one embodiment the diameter of the tubular member decreases with increasing pressure in the restrictor.

Figure 7:
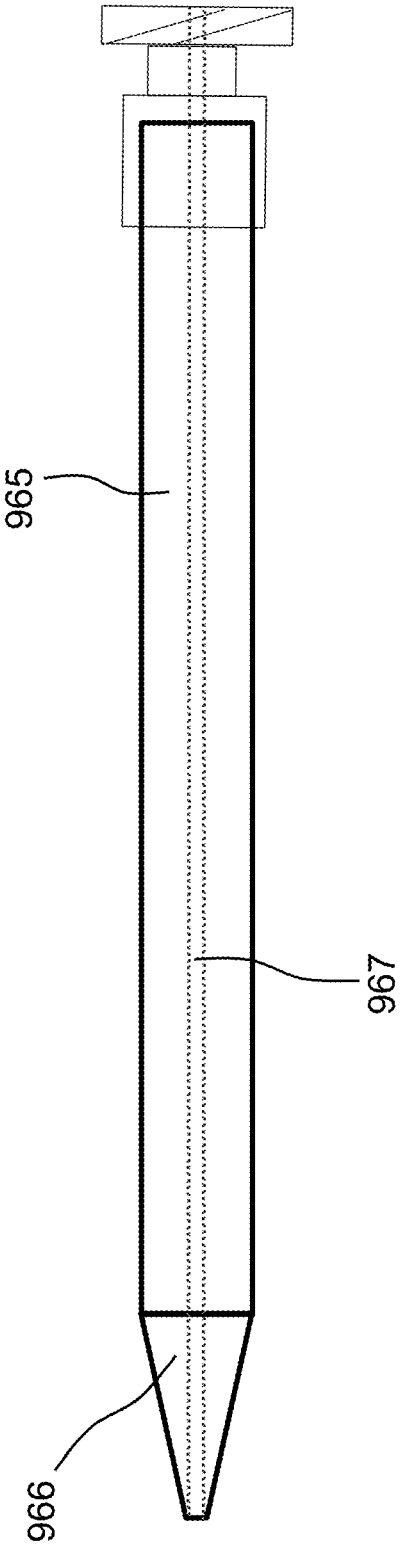
FIG. 7 shows a medical dilator.

FIG. 7 shows a medical dilator 901. The medical dilator 901 is useful for dilating a blood vessel in preparation for a treatment. For example, the dilator may be used to dilate a blood vessel before advancing a catheter therein. The medical dilator 901 includes an elongated shaft that is preferably substantially cylindrical for passing through a cylindrical lumen of a sheath. The medical dilator includes a guide wire lumen 967 through which a guide wire can extend for moving the dilator within a blood vein or blood vessel. The medical dilator 901 further includes a distal tip 966, which may include features that prevent damage to the blood vessel, such as, an atraumatic tip comprising a soft material. The medical dilator 901 is configured for use in a vessel access part of a procedure. The dilator may be configured so as to enable vessel access using the well-known Seldinger Wire Technique. The Seldinger Wire Technique or Seldinger Technique is a procedure (or sub-procedure) for establishing safe access to a blood vessel (or another vessel) for subsequent catheterization. The dilator 901 may be configured for use with any of the sheaths of this invention.

Figure 8:
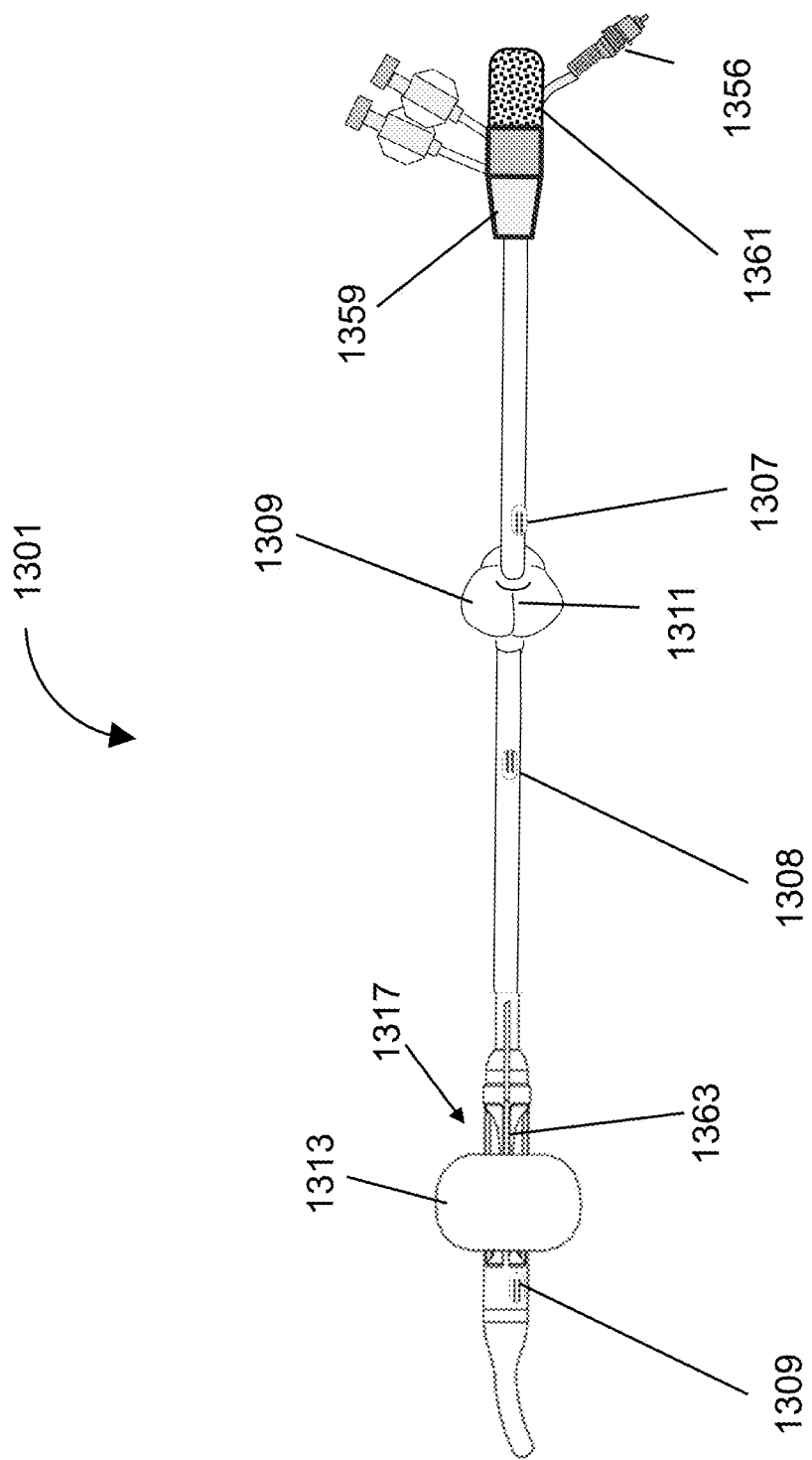
FIG. 8 shows a lymph flow catheter.

FIG. 8 shows a lymph flow catheter 1301. The catheter 1301 includes a proximal restrictor 1309 and a distal restrictor 1313 with at least one of the restrictors capable of defining a fluid flow path 1311. Both the proximal restrictor 1309 and the distal restrictor 1313 are depicted in the inflated state. In the depicted embodiment, the proximal restrictor includes the fluid flow path 1311. Because the proximal restrictor includes a fluid flow path 1311, a reduced pressure zone between the proximal and distal restrictor can be is more easily maintained. For example, the fluid flow path 1311 reduces the volume of fluid entering the target zone and thereby makes it easier to effect and sustain a pressure reduction in the target zone. The flow path 1311 is preferably configured such that a controlled flow may be maintained at all times during the procedure and so the therapy can continue even if the diameter of the proximal vessel changes during the course of therapy.

Preferably, the catheter 1301 includes pressure sensors for monitoring pressure within a blood vessel. For example, in one preferred embodiment, the catheter includes at least three pressure sensors. A first pressure sensor 1307 upstream of the proximal restrictor 1309, a second pressure sensor 1308 disposed between the first and second restrictors 1309, 1313, and a third pressure sensor 1309 distal to the distal restrictor 1313.

At a proximal portion of the catheter 1301 is a hub 1359. The hub 1359 can include any number of ports (e.g., a flush port, restrictor inflation ports), a connector 1356 for electronic communication with the pressure sensors 1307, 1308, and 1309, and a motor 1361. The motor 1361 may be connected to a pump 1363 disposed at a distal portion of the catheter 1301. For example, the pump 1363 may comprise an impeller that is housed within an assembly 1317 (i.e., an impeller assembly) within the distal portion of the catheter 1301. The impeller assembly 1317 may further include a number of inlets and outlets for allowing blood flow to move through the catheter's distal portion.

Figure 9:
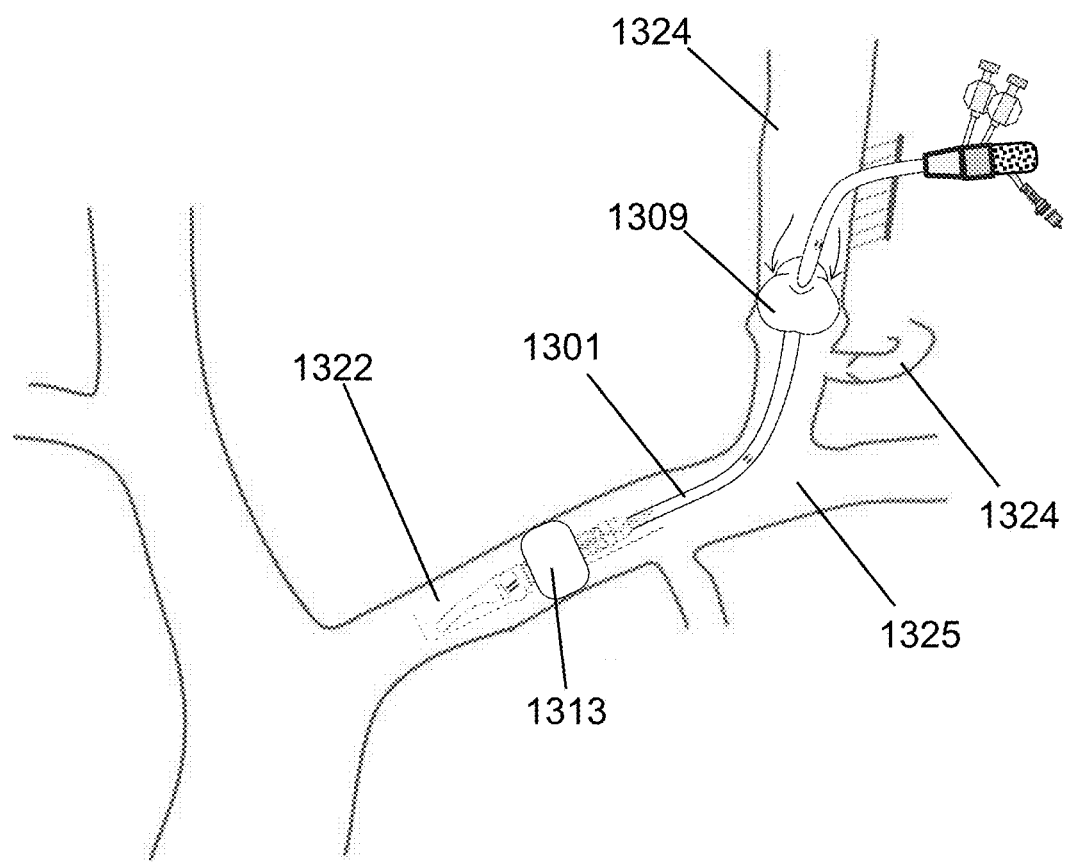
FIG. 9 illustrates the catheter inside a blood vessel.

FIG. 9 illustrates the catheter 1301 inside a blood vessel. The catheter 1301 extends from a patient's jugular vein 1324 and terminates inside an innominate vein 1322, such that a region between the distal restrictor 1313 and the proximal restrictor 1309, which are shown in a deployed state, align with a thoracic duct 1324. During a treatment, inflation of the proximal restrictor 1309 and distal restrictor 1313 define a target region for establishing a low-pressure region 1325 via operation of a pump. The low-pressure zone then facilitates the drainage of lymph from the thoracic duct 1324 and into circulation. The proximal restrictor 1309 includes a fluid flow path that helps maintain the low-pressure zone 1325 by reducing the volume flow rate of fluid entering the low-pressure zone 1325. Preferably, the catheter 1301 includes a pump that is activated to facilitate the removal of lymph. Preferably, the pump comprises an impeller disposed within an impeller assembly.

In one embodiment the low-pressure zone includes a distal section of the left internal jugular vein, a proximal section of the left innominate vein and the left subclavian vein. In this embodiment, since there is no restrictor in the left subclavian vein the entire up stream circulation of the left subclavian vein comprises part of the low-pressure zone. This includes the left axillary vein and left cephalic vein of the left arm and the left external jugular vein. The distribution of the low-pressure zone to a number of vessels and vessel segments in the region of the venous angle is a desirable attribute of the invention. Visualizing the thoracic duct outflow is difficult for treating physicians and the anastomosis between the thoracic duct and the venous system is very variable. In some patients the thoracic duct terminates at the venous angle, in others it terminates at the distal left internal jugular, in still others it terminates in the distal left subclavian vein, in others in the left external jugular vein, in a small number of patients in the proximal innominate vein and in many patients the thoracic duct comprises a bifurcated or trifurcated structure and there more than one termination site. The sheaths and catheters of this invention are preferable configured to create a low-pressure zone 1325 that includes at least some of the venous angle, the distal segment of the left internal jugular, the proximal end of the left innominate vein, the left subclavian vein, the left external jugular. Preferably the catheters and sheaths are configured to create a low-pressure zone that is sufficiently extensive to obviate the need for the treating physician to visualize or otherwise determine the point(s) of the anastomosis of the thoracic duct with the venous system.

In one embodiment the proximal restrictor 1309 is integral with the catheter 1301. With this embodiment the proximal restrictor 1309 and the distal restrictor 1313 are advanced together and simultaneously positioned in their respective vessel segments. The proximal and distal restrictors are preferably independently expanded such that each restrictor can be customized to the anatomy at the implant site. In an alternative to this arrangement two proximal restrictors may be integrated on the catheter to accommodate anatomical variations in thoracic duct outflow location. A further alternative would be to integrate a longer proximal restrictor balloon, preferably 50 to 100 mm long, that could be shortened proximally to accommodate anatomical variation by retracting it into 8-12 F introducer sheath prior to inflation. This would also serve to lock the relative position of the catheter to the sheath. The longer balloon embodiment could be shortened from the distal end also by incorporating a slidable sheath that moves from its distal end proximally prior to inflation. The capability of adjusting the length of the longer balloon from either the proximal or distal end allows the user to apply an effective flow restriction with varying thoracic duct outflow locations.

In another embodiment the proximal restrictor 1309 is slidable along the shaft of the catheter 1301. With this embodiment the position of the two restrictors can be adjusted relative to each other. The proximal restrictor is connected to a positioning member and advancement of the positioning member adjusts the position of the proximal restrictor on the catheter shaft. In one variation of this embodiment the positioning member further comprises a lumen, said lumen configured for the inflation of the proximal restrictor.

Figure 10:
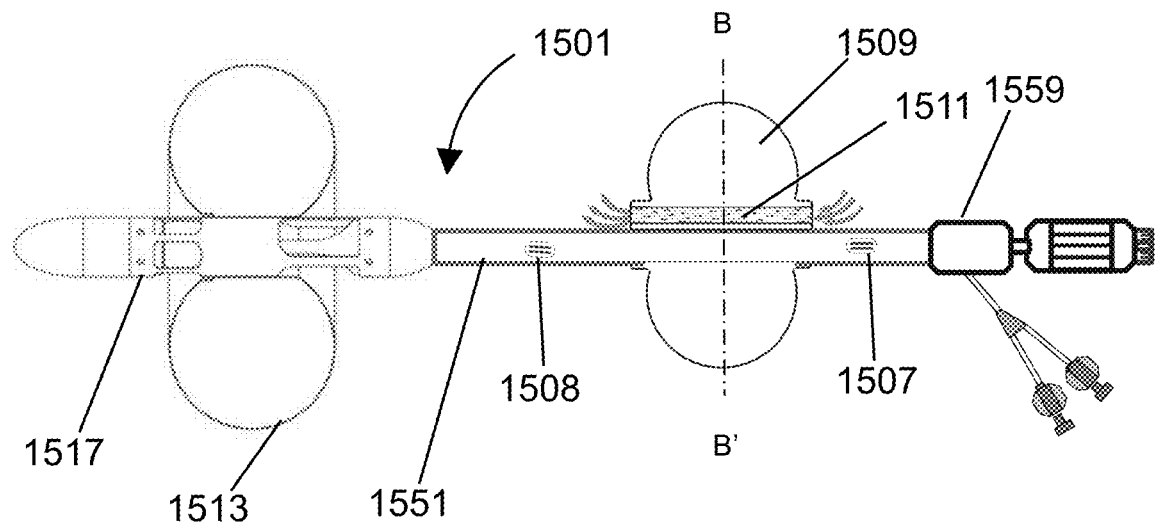
FIG. 10 shows a catheter according to other aspects of the invention.

FIG. 10 shows a catheter 1501 according to other aspects of the invention. The catheter 1501 includes a catheter shaft 1551 with an impeller assembly 1517 mounted to a distal portion thereof. The catheter shaft 1551 includes a proximal restrictor 1509 attached around an outer surface of the catheter shaft 1551. The proximal restrictor includes a flow channel 1511 that allows fluid to bypass the proximal restrictor 1509 at a controllable rate. The rate is controlled by manipulating a size and shape of the channel 1511. The size and shape of the channel is determined by restriction elements incorporated into the proximal restrictor balloon. Restriction elements may take the form of one or more fibers longitudinally positioned over the balloon that are fixed at the proximal and distal necks of the balloon but not the body section. They can be welded in place or reflowed under an overcoat layer that may also be used to attach the balloon to the sheath shaft. The fiber is desirably formed from a higher durometer polymer to the restrictor balloon to limit axial elongation (and radial expansion) during balloon inflation. An alternative embodiment uses a non-uniform cross section extrusion to form the balloon. By incorporating one or more thicker cylindrical or rectangular cross sections (restriction elements) into the balloon wall cross section, the axial elongation and radial expansion of that section is restricted thereby creating the channel 511 after balloon inflation. An advantage of this embodiment is that additional components are not required to form the restriction element. The size and shape of this channel can be manipulated by adjusting the geometry of the integrated restriction element. The restriction element may further incorporate a lumen. The lumen can contain and echogenic fluid, or air, both of which function to enhance the echogenicity of the restrictor balloon thereby aiding confirmation of balloon inflation and deflation. The lumen may also be used to contain the restriction fiber discussed above creating a hybrid approach. The proximal restrictor 1509 is depicted in a deployed state. In the deployed state the restrictor 1509 forms the fluid flow path 1511. The channel 1511 may comprise any number of shapes. For example, a cross-section of the channel 1511 may reveal that the channel is substantially cylindrical, D shaped, or crescent shaped. The channel 1511 may extend in a substantially linear direction along a surface of the catheter shaft 1551 or the channel may be substantially non-linear, for example, comprising one or more angles useful to slow the flow of fluid through the channel 1511. In some embodiments, the channel 1511 tapers from an inlet towards an outlet. In other embodiments, the channel 1511 tapes from the outlet towards the inlet.

The catheter 1501 includes at least two pressure sensors for monitoring pressure within the blood vessel during treatment. Preferably, the catheter includes a first proximal pressure sensor 1507 upstream of the proximal restrictor 1509 and a second distal restrictor 1508 disposed between the proximal and distal restrictors 1509, 1513.

At a proximal portion of the catheter 1501 is a hub 1559. The hub 1559 includes one or more ports for controlling aspects of the catheter during treatment. For example, the hub 1559 may include an inflation port for inflating one or more of the restrictors 1509, 1513. In at least some embodiments, hub 1559 includes an inflation port for manipulating a size of the fluid flow path 1511 inside the patient body during treatment. For example, the channel 1511 may comprise an inflatable tube that is disposed within the proximal restrictor 1509. Providing a fluid via the inflation port may cause the flow path 1511 to expand, thereby increasing in size of the channel 1511 and allow more fluid to bypass the restrictor 1509.

Figure 11:
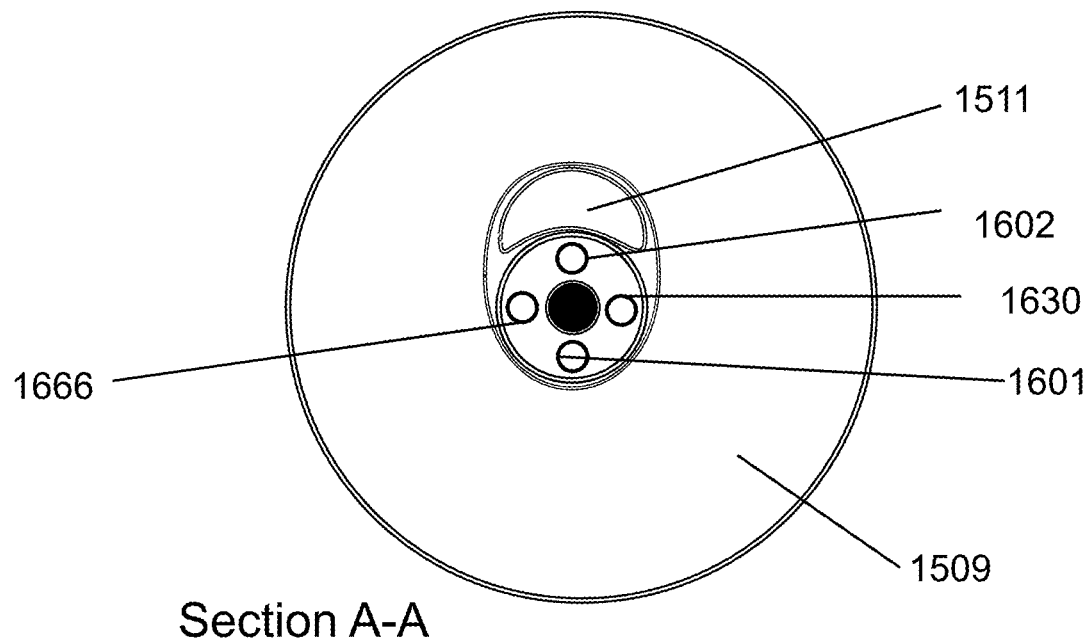
FIG. 11 is a cross-section showing lumens of the catheter shaft.

FIG. 11 is a cross-section taken along line B-B' to reveal internal lumens of the catheter shaft 1551. The internal lumens extend internally through the catheter shaft 1551. Shown is a proximal restrictor lumen 1601 for delivering fluids, i.e., gas or a liquid, used to inflate the proximal restrictor 1509. A separate distal restrictor lumen 1602 is provided for delivering fluids to inflate the distal restrictor 1513. The separate lumens can allow the proximal and distal restrictors 1509, 1513 to be manipulated independently of one another during therapeutic treatments. A pressure sensor lumen 1666 is provided for sending and receiving electrical signals with one or more pressure sensors disposed on the catheter 1501. One or more reinforcement lumens 1630 may be provided to reinforce the catheter 1501 so that the catheter 1501 can be more easily navigated through the body. Additional lumens may be provided to deliver fluids to a tube defining a channel within the proximal restrictor 1511.

Figure 12:
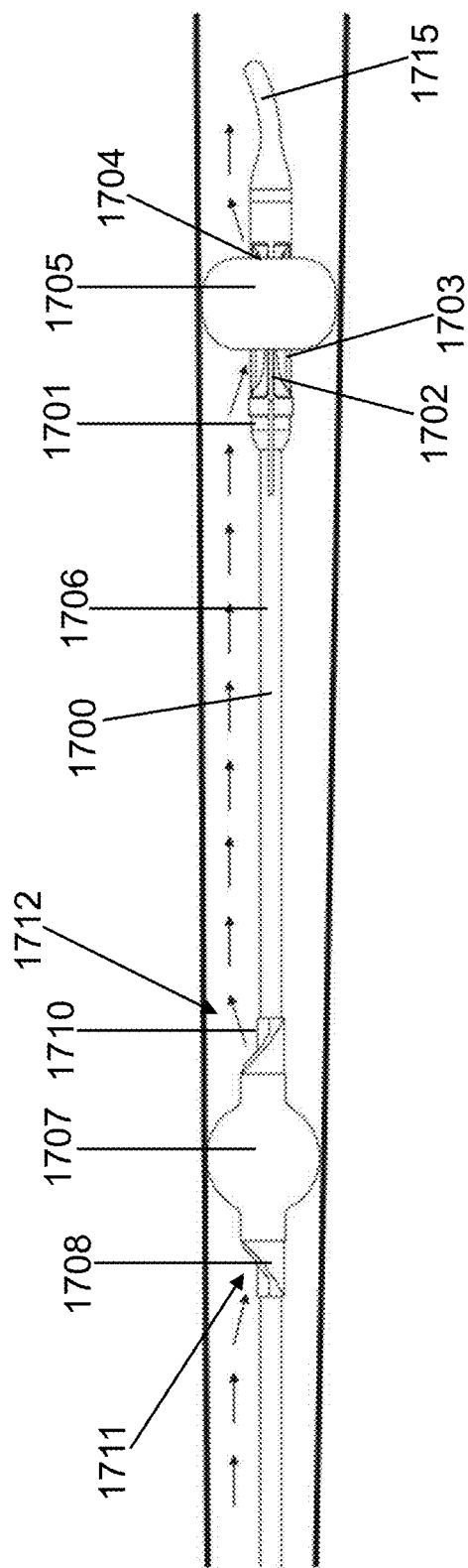
FIG. 12 shows a catheter according to other aspects of the invention.

FIG. 12 shows a catheter 1700 according to other aspects of the invention. The catheter 1700 includes a flow-through assembly 1708 for allowing a predetermined amount of fluid to bypass a proximal restrictor 1707. The flow through assembly 1708 includes a flow tube 1710 connected to the catheter shaft 1706 with the restrictor 1707 mounted around an external surface thereof. The flow tube 1710 includes a flow channel inlet 1711 and an outlet 1712 through which a predetermined amount of fluid can pass (indicated by arrows).

A distal restrictor 1705 is mounted around a distal portion of the catheter 1700. The distal portion of the catheter further includes an impeller assembly 1701. The impeller assembly houses an impeller 1702 rotatably disposed therein. The impeller assembly further includes one or more inlets 1703 and outlets 1704 that provide a passage-way for fluid to flow while the catheter is operating inside a blood vessel. The catheter 1700 further includes a tip 1715 (e.g., an atraumatic tip) disposed at the distal end.

Figure 13:
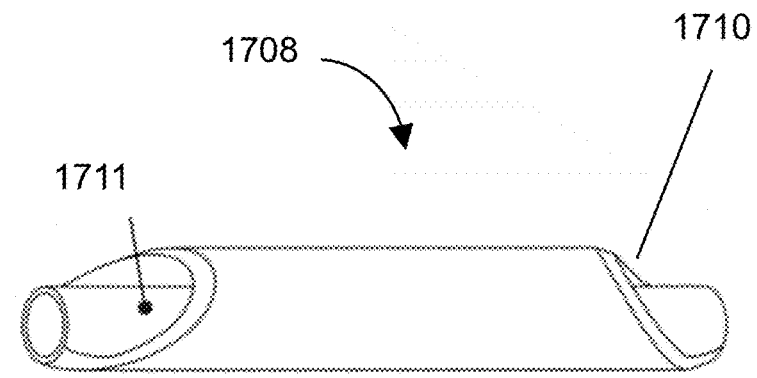
FIG. 13 shows a flow-through assembly without the proximal restrictor.

FIG. 13 shows a close-up view of the flow-through assembly 1708 without the proximal restrictor 1707. The proximal restrictor 1707 can be welded or bonded to the outside surface of the flow tube 1710. The flow tube 1710 is eccentrically fixed to the catheter shaft 1706.

Figure 14:
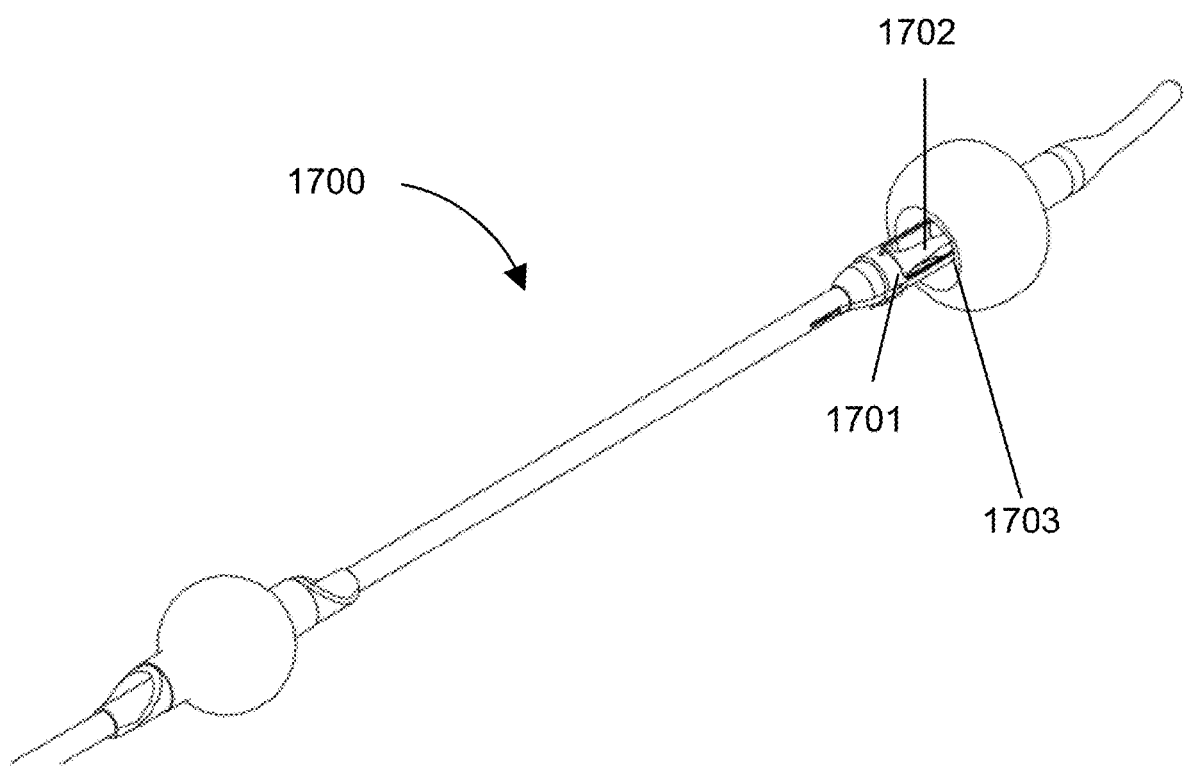
FIG. 14 shows a distal looking view of the catheter.

FIG. 14 shows a distal looking view of the catheter 1700. This view better illustrates an inlet 1703 of the impeller assembly 1701 with the impeller 1702 at least partially visible at the inlet 1703. During operation, a motor connected to the impeller 1702 is activated to rotate the impeller 1702, thereby pulling fluid into the inlet 1703, and through the distal portion of the catheter 1700. For more discussion on the catheter assembly, see co-owned, U.S. patent application Ser. No. 16/801,994, which is incorporated by reference.

Figure 15A:
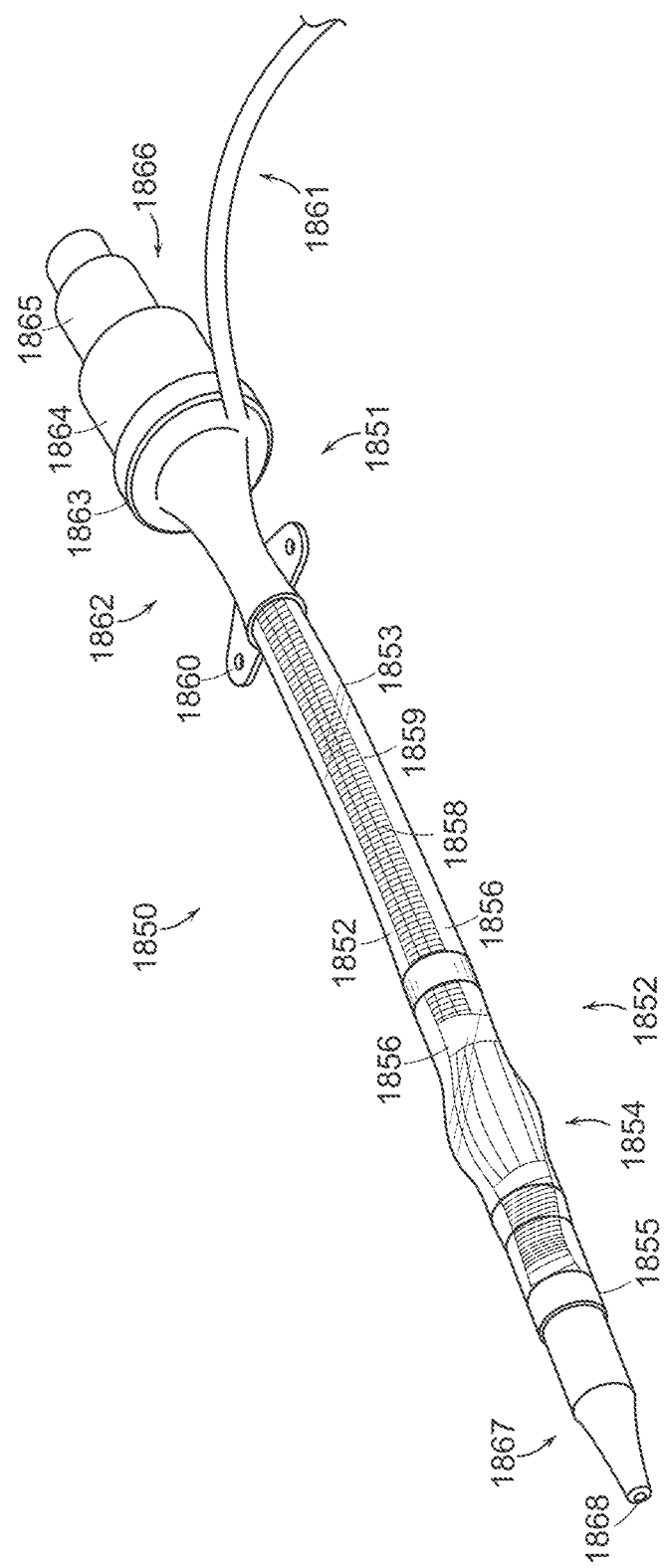
FIG. 15A shows a sheath according to aspects of the invention.

FIG. 15A shows a sheath 1850 according to aspects of the invention. The sheath 1850 includes a proximal portion 1851 and a distal portion 1852. The distal portion 1852 is dimensioned for insertion into a vein or artery. The sheath 1850 may comprise an elongated cylindrical body 1853 that is substantially smooth across its surface with a precision restrictor 1854 that is mounted near a distal tip 1855. The body 1853 may comprise multiple parts that offer certain structural features. For example, the body 1853 may comprise a jacket 1856 disposed over a shaft 1857 with a coil 1858 disposed therein. The coil 1858 can provide structural support around a circumference of the body 1853 to prevent an interior lumen (e.g., a lumen for receiving a catheter) from collapsing after insertion into the blood vessel.

The restrictor 1854 preferably comprises a balloon designed to be inflated (corresponding to a deployed configuration) and deflated (corresponding to a relaxed configuration). In the inflated state, the restrictor at least partially occludes the blood vessel. Preferably, the restrictor is inflated in response to delivery of a fluid. Accordingly, the restrictor can be made from any one or more of a variety of materials configured to expand upon the delivery of a fluid thereto and to contract upon the withdrawal of the fluid. Exemplary materials from which the restrictor 1854 can be made includes polymeric materials such as PEBAX, silicones, polyurethanes, and nylons.

The device 1850 includes an inflation lumen 1859. The inflation lumen 1859 is fluidically coupled with the first restrictor 1854 to provide a mechanism for inflating the first restrictor 1859 inside the blood vessel. The first restrictor 1859 is inflatable via the inflation lumen 1859 by delivering a fluid such as saline through the inflation lumen to the first restrictor 1854. A pump may be used to facilitate the delivery of the fluid through the lumen 1859 and into the first restrictor 1854.

In at least some embodiments, the distal tip 1855 is a soft atraumatic tip that facilitates smooth, safe introduction of the sheath 1850 into the vein. Exemplary materials from which the atraumatic tip can be made include polyurethanes.

The proximal portion 1851 of the sheath 1850 is external to a patient's body during a treatment. The proximal portion 1851 can include a number of features for navigating and securing the catheter system in place during the treatment. For example, the proximal portion may include a suture ring 1860 to secure sheath 1850 during catheter manipulation or during prolonged vascular access. Additionally, the proximal portion 1851 may include multi-lumen tubing 1861. The multi-lumen tubing 1861 may include the inflation lumen 1859. The multi-lumen tubing may also include a lumen for one or more pressure sensors disposed on the sheath 1850. The proximal portion 1851 also includes a hub 1862 that contains a septum valve 1863 and a thread 1864 to engage and lock with a corresponding thread on the dilator 1866. The sheath 1850 is shown with a dilator 1866 in place to enable delivery over a standard 0.035" guidewire. The dilator includes a profiled tip 1867 to minimize trauma during delivery and a lumen 1868 compatible with off the shelf 0.035" guidewires running from the distal tip to proximal end of the dilator 1866. The dilator also include a flushing luer 1865 to facilitate flushing of the lumen 1868.

Figure 15B:
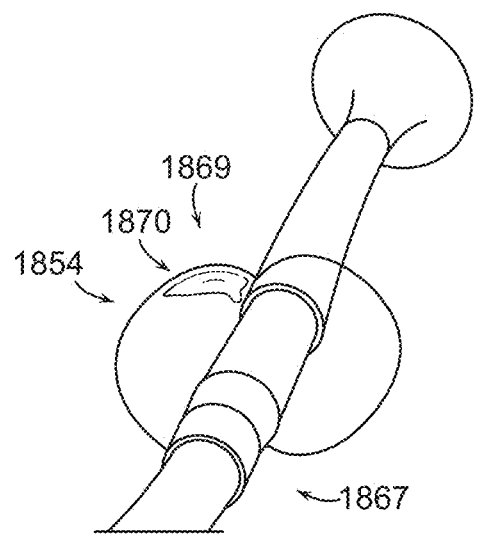
FIG. 15B is a perspective view from a distal end of the sheath.

FIG. 15B is a perspective view from the distal end 1852 of the sheath. The precision restrictor 1854 is shown in FIG. 15*b* in the inflated state. In this embodiment the precision restrictor comprises two flow paths 1869 disposed diametrically opposite each other. The flow paths 1869 comprise regions of concavity 1870 extending the length of the precision restrictor 1854. It will be appreciated that when this restrictor balloon is inflated in a vein that the restrictor will induce a shape change in the vein that is non-circular. The vein will conform to the curve of the convex regions but will take the shortest path across the concave region. In this case the vein will assume a shape of a rounded rectangle when expanded. It will be appreciated that a variety of shapes are possible depending on the number of regions of concavity on a precision restrictor. Preferably there are just two flow paths and thus two regions of concavity.

Figure 16:
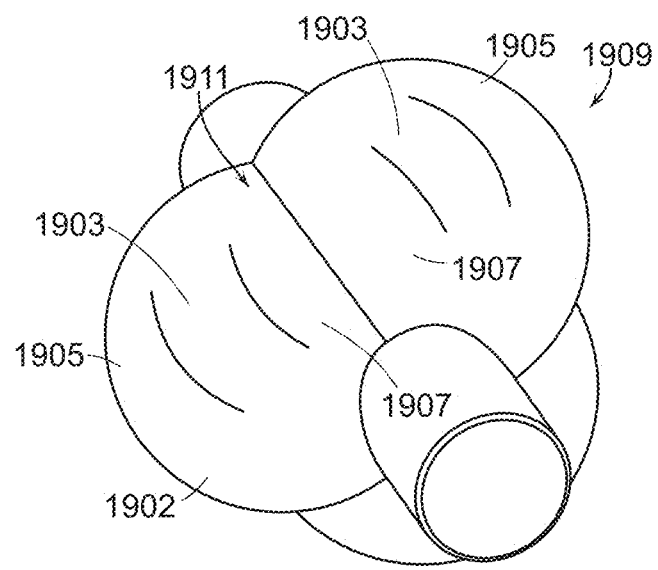
FIG. 16 shows a precision restrictor of some embodiments.

FIG. 16 shows a precision restrictor 1909. The precision restrictor 1909 is shown in a deployed configuration. In the deployed configuration, an exterior surface 1902 of the restrictor 1909 defines flow paths 1911 between the exterior surface 1902 and a blood vessel wall (not shown for clarity). In particular, the exterior surface 1902 comprises inflection points 1903, or inflection regions, that are formed by a shape of the exterior surface 1902. The inflection points 1903 are preferably neither concave or convex and instead define a transition region between a convex surface 1905 and a concave surface 1907. As illustrated, each fluid flow path 1911 may be disposed between two inflection points 1903 defining a concave surface 1907. The fluid flow paths 1911 are designed to allow only a predetermined amount of fluid to bypass the restrictor 1909 when the restrictor 1909 is the deployed inside the blood vessel. The precision restrictor 1909 of FIG. 16 may be applied to any of the sheaths or systems of the invention.

Figure 17:
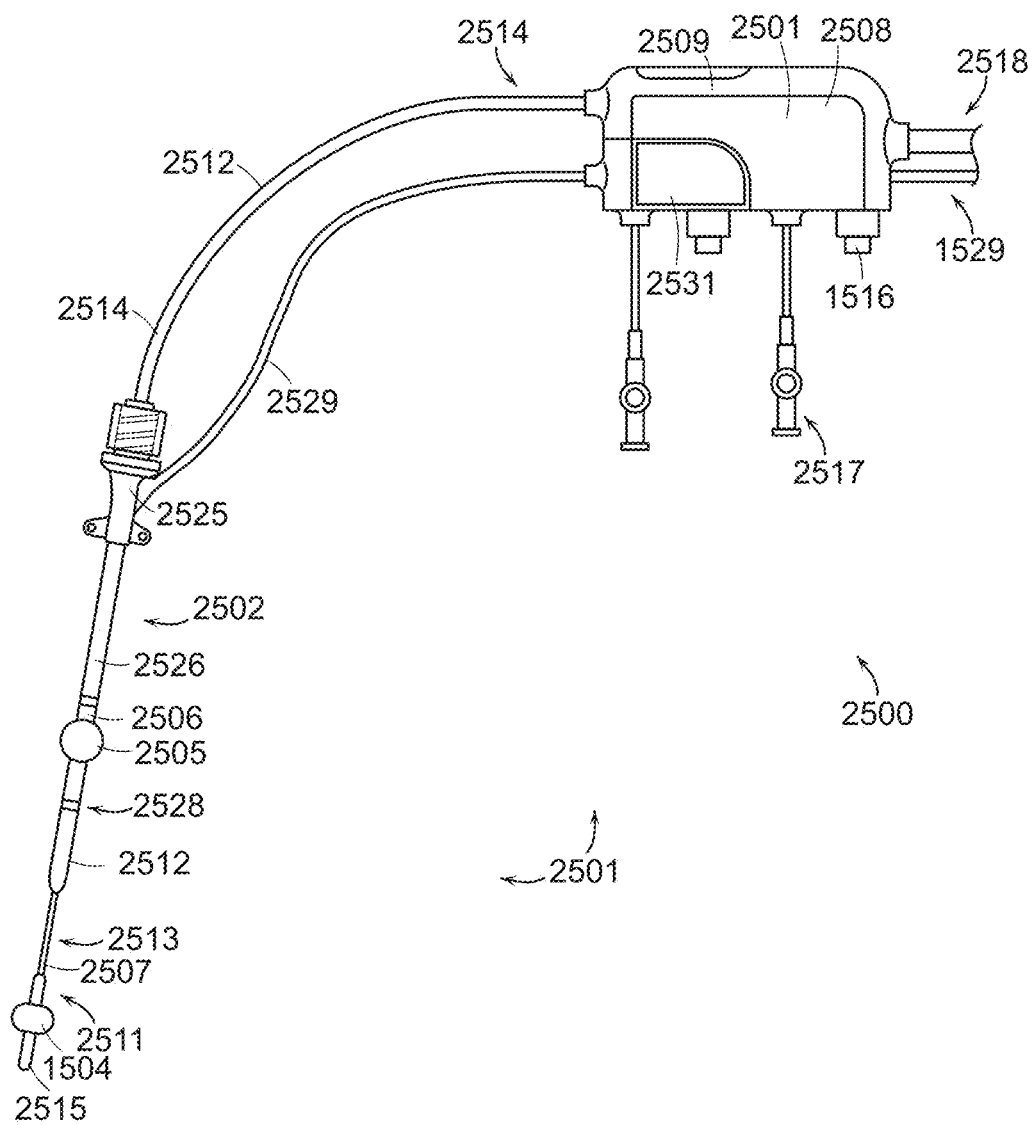
FIG. 17 shows a distal portion of one system of the invention.

FIG. 17 shows a distal portion of one system 2500 of the invention.

Figure 18:
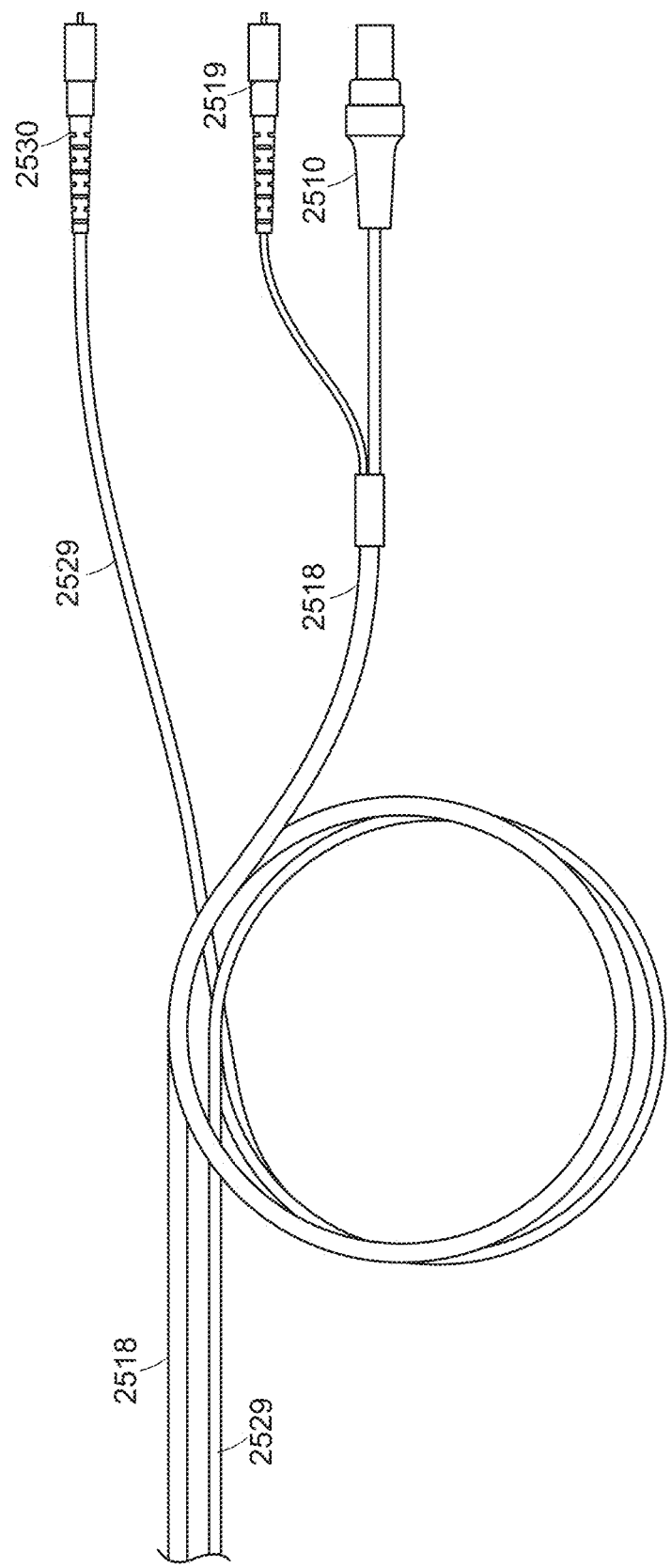
FIG. 18 shows a proximal portion of the one system.

FIG. 18 shows a proximal portion of the one system 2500. The proximal portion and the distal portion of the one system 2500 are preferably connected by and include the catheter lead 2518 and the sheath lead 2529.

The system 2500 comprises a catheter assembly 2501, a sheath 2502 and a console 2503 (not shown). The catheter assembly 2501 is shown with the catheter distal section 2513 extending through and distal of the sheath 2502 and the catheter proximal end 2514 extending proximally of the sheath hub 2525. This configuration of the catheter assembly 2501 and sheath 2502 is representative of an in-use configuration where the sheath 2502 is placed in a peripheral vein, like an internal jugular, and the catheter distal section 2513 extends into a deeper vein, like an innominate or superior vena cava vein. The catheter assembly 2501 comprises a first or distal restrictor 2504, at least one pressure sensor 2507, a pump assembly 2511, an atraumatic tip 2515, a multilumen shaft 2512, a catheter manifold 2508, catheter assembly flush port 2516, a distal balloon inflation port 2517, catheter lead 2518, at least one catheter pressure sensor connector 2507 and a catheter motor connector 2510. The pump assembly 2511 comprises a metallic housing 2521 (underneath the distal restrictor), an impeller 2522 within the housing 2521, and precision bearings 2523 also within the pump assembly 2511.

The sheath 2502 comprises a hub 2525, a shaft 2526, a second restrictor 2505, a distal tip 2528, a sheath lead 2529, a sheath manifold 2531 integrated with catheter manifold 2508, and a sheath pressure connector 2530.

The sheath restrictor 2505 may comprise a precision restrictor and may be fixed relative to the vessel wall distal of the site of vascular access. The fixing of the sheath precision restrictor to the vessel wall may comprise internal fixation, external fixation or both. With internal fixation the precision restrictor 2505 is expanded such that it engages with the wall of the vein and applies a force to the vein. Even so, the precision restrictor 2505 of the sheath 2502 is configured to allow some blood flow to pass between portions of its outer surface and the wall of the vein. With external fixation the sheath hub 2525 is fixed to the skin of the patient with sutures using suture holes in the hub or a statlock device. Even with the sheath 2502 fixed in place the catheter (distal) restrictor 2504 can be advanced, retracted or rotated relative to the sheath (proximal) restrictor 2505. This allows the catheter assembly 2501 and sheath 2502 to accommodate wide variations in anatomy and gives the doctor significant flexibility in the treatment. Additionally, the fixing of the sheath restrictor 2505 to the wall of the vessel does not occlude blood flow in the access vessel (internal jugular for example) and so the doctor does not need to be concerned or monitor upstream pressures. Indeed, the sheath 2502 comprises a pressure sensor 2506 proximal of the sheath precision restrictor 2505, yet in the blood vessel, and this sheath pressure sensor 2506 provides pressure information to the console (and the doctor) on the venous pressures upstream of the proximal restrictor 2505. The sheath restrictor 2505 comprises a collapsed state for insertion into the access vessel and an expanded or inflated state for treatment.

The catheter restrictor 2504 comprises a collapsed state for delivery through the sheath 2502 and an expanded or inflated state for treatment. In the expanded states the combination of the catheter (distal) restrictor 2504 and the sheath (proximal) restrictor 2505 define two boundaries of a region of the venous system that is the target for therapy. The region of the venous system that is the target for therapy is selected to include the outflow of at least one lymphatic duct, preferably the thoracic duct. With both proximal and distal restrictors in the expanded state the operation of the impeller 2522 in the pump assembly 2511 causes this region to become depressurized and this in turn induces lymph flow into the depressurized region. The depressurized region stimulates lymph flow across the entire drainage network of the lymphatic duct. In the case of the thoracic duct this drainage network includes all of the abdominal and lower limb lymphatic network as well as some of the thoracic lymph network and thus represents a significant stimulus to lymphatic drainage.

It will be appreciated that blood continues to flow into the depressurized region across the precision restrictor 2505 on the sheath 2502 as well as from branch vessels between the proximal and distal restrictors (2505 & 2504). A pressure sensor 2507 on the catheter distal end 2513 between the distal and proximal restrictors (2505 & 2504) measures pressure in the isolated region of the venous system and this pressure measurement is fed to and processed by the console 2503 which in turn controls the speed of the motor 2509 which drives the impeller 2522. The blood pressure in the depressurized region is thus controlled by the doctor on the console 2503 in a closed loop manner. This arrangement allows the doctor to insert the sheath 2502, catheter distal region 2513 and then inflate the proximal and distal restrictors (2505 and 2504) and operate the system with minimal interference over extended therapy durations.

In at least some embodiments, the restrictor(s) of a catheter can be inflated and deflated from time to time to enable free flow of blood in a patient's vein in which the restrictor(s) are positioned and thus enable the system to stop working for a period of time. This period of time can be required in such treatments to allow for the assessment of the patient's clinical condition, allow the patient to undergo other treatments or enable him to go to the bathroom and/or to wash any stagnation points that might have occurred.

The catheters described herein can be configured to be placed in a patient's body for up to about seventy-two hours, e.g., the catheter can be indwelled in the body for up to about seventy-two hours. Alternative embodiments can be configured for longer time periods by adjusting treatment protocols. The catheter systems described herein that include the catheters can be operated in a treatment time period in a range of about 6 to 8 hours. At the end of each treatment period, the restrictors are deflated, the catheter can be filled with a heparin catheter locking solution, and an assessment of the patient's clinical condition can be performed. The catheter system can be operated again if desired by medical personnel. Within the indwelling period of the catheter, a number of treatment periods can be in a range of 3 to 6 cycles, e.g., for a maximum of about forty hours of operation within a seventy-two hour indwelling period.

Furthermore, various systems and methods are provided for reducing pressure at an outflow of a duct such as the thoracic duct or the lymphatic duct. In general, the systems and methods may be effective to reduce edema conditions, such as pulmonary edema, in a patient by lowering an outflow pressure in a region around the patient's thoracic/lymphatic duct outflow. As a result of lowering the outflow pressure at the thoracic and/or lymphatic ducts, higher lymphatic return will be achieved, enabling the lymphatic vessel flow to be at or near normal levels. The systems and methods may be effective to rapidly alleviate conditions of the edema and increase the patient response rate. In an exemplary embodiment, the systems and methods may be particularly useful to treat acute pulmonary edema. However, a person skilled in the art will appreciate that the systems and methods can be used in various procedures for treating a lymphatic system fluid clearance imbalance.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A catheter system for removing excess fluid, the system comprising:
a sheath dimensioned for insertion into a blood vessel, the sheath comprising a first selectively deployable restrictor mounted to an exterior surface of the sheath, the first selectively deployable restrictor comprising an inflated state and a collapsed state, wherein an exterior surface of the first selectively deployable restrictor comprises a membrane comprising at least one biaxial stretch region configured to be compliant in a circumferential direction, and at least one longitudinal stretch resistant strip configured to be relatively stiff in an axial direction, wherein, when in an inflated state within a blood vessel, the longitudinal stretch resistant strip defines at least one flow path configured to permit an amount of fluid flow within the blood vessel through the flow path past the first selectively deployable restrictor to maintain fluid flow in a vessel segment upstream of the first selectively deployable restrictor; and
a catheter, slidably disposed within the sheath, the catheter comprising a proximal portion and a distal portion with a second selectively deployable restrictor mounted to the distal portion, wherein the distal portion of the catheter is configured to extend from a distal end of the sheath such that the second selectively deployable restrictor is downstream of the first selectively deployable restrictor inside the blood vessel, wherein the sheath and the catheter are configured to be independently moveable within the blood vessel relative to each other thereby allowing the first selectively deployable restrictor to be independently positioned at a first location inside the blood vessel by movement of the sheath and the second selectively deployable restrictor to be independently positioned at a second location inside the blood vessel by movement of the catheter through the sheath such that the first location and the second location define a precise region of low pressure for withdrawing excess fluid.

2. The system of claim 1, wherein the second selectively deployable restrictor comprises an inflated state and a collapsed state, wherein each of the first selectively deployable restrictor and the second selectively deployable restrictor is configured to at least partially occlude the blood vessel when in an inflated state.

3. The system of claim 1, wherein the first restrictor and second restrictor comprise inflatable balloons.

4. The system of claim 1, wherein the blood vessel is a jugular vein.

5. The system of claim 1, wherein the locations of the first restrictor and second restrictor define a region of low pressure inside the blood vessel.

6. The system of claim 1, further comprising an inlet and an outlet disposed on the distal portion of the catheter wherein, during operation, fluid flows through the distal portion of the catheter via the inlet and out of the outlet.

7. The system of claim 6, further comprising a pump for pumping fluid into the inlet and out of the outlet inside the blood vessel.

8. The system of claim 7, wherein the pump is external to the patient.

9. The system of claim 7, wherein the distal portion of the catheter comprises an impeller assembly, and the pump comprises an impeller that is rotatably disposed within the impeller assembly.

10. The system of claim 9, wherein the second restrictor is mounted to the impeller assembly.

11. The system of claim 7, further comprising a control module comprising a controller, wherein the control module is configured to control operation of the pump in response to one or more of a user input and an input from one or more sensors.

12. The system of claim 11, further comprising a pressure sensor disposed on the sheath or the catheter, wherein the control module receives input from the pressure sensor and controls the pump based on said input.

* * * * *